US 11,685,382 B2
Jun. 27, 2023

(12) United States Patent
Taveira

(10) Patent No.: US 11,685,382 B2
(45) Date of Patent: Jun. 27, 2023

(54) PASSENGER-LESS AND DRIVER-LESS VEHICLE OPERATING MODES

(71) Applicant: QUALCOMM Incorporated, San Diego, CA (US)

(72) Inventor: Michael Franco Taveira, Rancho Santa Fe, CA (US)

(73) Assignee: QUALCOMM Incorporated, San Diego, CA (US)

(*) Notice: Subject to any disclaimer, the term of this patent is extended or adjusted under 35 U.S.C. 154(b) by 616 days.

(21) Appl. No.: 16/725,362

(22) Filed: Dec. 23, 2019

(65) Prior Publication Data
US 2021/0188287 A1    Jun. 24, 2021

(51) Int. Cl.
| | | |
|---|---|---|
| *B60W 40/08* | (2012.01) | |
| *B60N 2/04* | (2006.01) | |
| *B62D 1/183* | (2006.01) | |
| *B60N 2/22* | (2006.01) | |

(52) U.S. Cl.
CPC .............. *B60W 40/08* (2013.01); *B60N 2/04* (2013.01); *B60N 2/22* (2013.01); *B62D 1/183* (2013.01); *B60W 2040/0881* (2013.01)

(58) Field of Classification Search
CPC . B60W 40/08; B60W 2040/0881; B60N 2/04; B60N 2/22; B62D 1/183
USPC ......................................................... 701/36
See application file for complete search history.

(56) References Cited

U.S. PATENT DOCUMENTS

| | | | |
|---|---|---|---|
| 4,787,674 A  * | 11/1988 | Inaba ................... | B60N 2/0705 297/317 |
| 8,955,994 B2 | 2/2015 | Hartmann et al. | |
| 10,025,899 B2 | 7/2018 | Tarte et al. | |
| 10,036,333 B2 | 7/2018 | Leone et al. | |
| 10,214,219 B2 | 2/2019 | Richards et al. | |
| 2015/0120135 A1* | 4/2015 | Lawrenson ......... | B60W 50/085 701/36 |
| 2017/0166088 A1* | 6/2017 | Frye ........................ | B60N 2/06 |
| 2018/0022182 A1 | 1/2018 | Miller et al. | |

(Continued)

FOREIGN PATENT DOCUMENTS

| | | | |
|---|---|---|---|
| DE | 102015120208 A1 * | 5/2017 | |
| DE | 102015120208 A1 | 5/2017 | |
| DE | 102017011996 B3 | 3/2019 | |

OTHER PUBLICATIONS

Patent Translation; Machine Translation of previously cited DE 10-2015-120208 (Year: 2015).

*Primary Examiner* — Jonathan M Dager
*Assistant Examiner* — Jean W Charleston
(74) *Attorney, Agent, or Firm* — Qualcomm Incorporated

(57) ABSTRACT

Various embodiments include methods and vehicles that may include determining whether to initiate a configuration change protocol to implement a configuration change for modifying the arrangement of the vehicle internal structure in response to a planned or predicted future operating mode, event or environment. Also, determining whether an occupancy status of the vehicle conflicts with an occupancy status allowed for in a configuration called for by a configuration change input or indication. Further, modifying an arrangement of the vehicle internal structure in accordance with the configuration change input or indication in response to determining that the occupancy status of the vehicle does not conflict with the occupancy status allowed for in the configuration called for by the configuration change.

32 Claims, 9 Drawing Sheets

(56) References Cited

U.S. PATENT DOCUMENTS

| | | | |
|---|---|---|---|
| 2018/0120863 A1* | 5/2018 | Barra | B60N 2/002 |
| 2019/0039623 A1* | 2/2019 | Kim | A61B 5/05 |
| 2019/0184959 A1 | 6/2019 | Cao et al. | |
| 2019/0217749 A1* | 7/2019 | Kato | B60N 2/22 |
| 2020/0010089 A1* | 1/2020 | Ford | B60W 10/10 |
| 2021/0188293 A1 | 6/2021 | Taveira | |

* cited by examiner

PASSENGER-LESS AND DRIVER-LESS VEHICLE OPERATING MODES

BACKGROUND

The advent of autonomous and semi-autonomous automobiles and other motor vehicles promises to ease the task of moving people, merchandize, and even the vehicles themselves from one place to another. For example, rather than having to maintain constant attention on the road and other vehicles, a vehicle operator may allow an autonomous or semi-autonomous vehicle to control all or most of the driving operations. Also, a fully autonomous vehicle, which does not require a driver, may operate without passengers.

For vehicles that change from autonomous operation to manual operation, or vise-versa, the change mainly involves a computerized vehicle management system either relinquishing or taking control of the operation of the vehicle. However, such changes between autonomous and manual operations do not take advantage of many vehicle design constraints that either change or are no longer relevant as a result.

SUMMARY

Various aspects include autonomous vehicles and methods implemented in such vehicles supporting driverless and passenger-less operating modes to take advantage of improvements in operating efficiency, cargo carrying capacity, etc. by altering configurations that are possible when there is no driver and/or passenger present in the vehicle.

Various aspects may include determining, for example by a vehicle processor, whether to initiate a configuration change protocol to implement a configuration change for modifying the exterior shape of a body of the vehicle in response to a planned or predicted future operating mode, event or environment, determining whether an occupancy status of the vehicle conflicts with an occupancy status allowed for in a configuration called for by a configuration change input or indication, and modifying the exterior shape of the body of the vehicle in accordance with the configuration change input or indication in response to determining that the occupancy status of the vehicle does not conflict with the configuration change input or indication, in which modifying the exterior shape of the body of the vehicle includes modifying a configuration of at least one exterior vehicle part.

Some aspects may further include determining whether a current vehicle configuration matches a configuration called for by the configuration change input or indication, in which modifying the exterior shape of the body of the vehicle may be further in response to determining that the current vehicle configuration does not match the configuration called for by the configuration change input or indication. In some aspects, modifying the exterior shape of the body of the vehicle in accordance with the configuration change input or indication in response to determining that the occupancy status of the vehicle does not conflict with the configuration change input or indication may include modifying the exterior shape of the body of the vehicle to a no-occupant configuration in response to determining that the vehicle is not occupied. In some aspects, modifying the exterior shape of the body of the vehicle to the no-occupant configuration may include reducing at least one of an inclination angle of a windshield, a height of a roof relative to a base of the vehicle, or a position of a window. Some aspects may further include adjusting or more parameters of autonomous vehicle navigation or operation to implement a passenger-less mode of operation. Some aspects may include not modifying a configuration of the vehicle and notifying an operator in response to determining that the occupancy status of the vehicle conflicts with the configuration change input or indication.

Some aspects may further include determining whether an occupant of the vehicle is driving, and modifying an interior configuration of the vehicle to a driverless configuration in response to determining that no occupant is driving the vehicle. In some aspects, modifying an interior configuration of the vehicle to the driverless configuration may include changing an inclination angle of a windshield of the vehicle. Some aspects may further include adjusting one or more parameters of autonomous vehicle navigation or operation to implement a driverless mode of operation in response to determining that no occupant is driving the vehicle. Some aspects may further include modifying the exterior shape of the body of the vehicle to a driven configuration in response to determining that an occupant of the vehicle is driving. In some aspects, modifying the exterior shape of the body of the vehicle to the driven configuration may include changing at least one of an inclination angle of a windshield, a height of a roof relative to a base of the vehicle, or a position of a window. Some aspects may include modifying the exterior shape of the body of the vehicle in accordance with the configuration change input or indication, in which modifying a configuration of at least one vehicle body part relative to other vehicle parts, includes at least one vehicle body part selected from a pillar, a quarter panel, a roof, a hood, a trunk, a windshield, or a window.

In some aspects, modifying the exterior shape of the body of the vehicle to the driven configuration may include modifying a configuration of at least one body part selected from a pillar, a quarter panel, a roof, a hood, a trunk, a windshield, or a window. In some aspects, modifying the exterior shape of the body of the vehicle may include activating actuators configured to change the exterior shape of the body of the vehicle. In some aspects, modifying the exterior shape of the body of the vehicle in accordance with the configuration change may include modifying the exterior shape of the body of the vehicle in accordance with an occupied or unoccupied alternative of the configuration change based on the determined occupancy state. Some aspects may include selecting a configuration alternative based on a predicted occupancy status of the vehicle determined based on a configuration change input or indication in response to determining that the predicted occupancy status of the vehicle does not conflict with the occupancy status allowed for in the configuration called for by the configuration change input or indication.

Various aspects may include receiving, by for example a vehicle processor, a configuration change input associated with a configuration of a vehicle structure, determining whether the configuration of a vehicle structure matches a configuration of current parts that make up the vehicle, and modifying the vehicle structure to the configuration based on the received configuration change input in response to determining that the configuration of the vehicle structure does not match the configuration of current parts that make up the vehicle.

Various aspects may include determining whether to initiate a configuration change protocol to implement a configuration change for modifying the arrangement of the vehicle internal structure in response to a planned or predicted future operating mode, event or environment, determining whether an occupancy status of the vehicle conflicts with an occupancy status allowed for in a configuration called for by a configuration change input or indication, and modifying an arrangement of the vehicle internal structure in accordance with the configuration change input or indication in response to determining that the occupancy status of the vehicle does not conflict with the occupancy status allowed for in the configuration called for by the configuration change.

Some aspects may include determining whether a current vehicle configuration matches a configuration called for by the configuration change input or indication, wherein modifying the arrangement of the vehicle internal structure in accordance with the configuration change input or indication is further in response to determining that the current vehicle configuration does not match the configuration called for by the configuration change input or indication. Some aspects may further include determining whether there is an occupant in the vehicle. In some aspects modifying the arrangement of the vehicle internal structure in accordance with the configuration change input or indication may include changing to a driverless configuration in response to determining that the occupancy status of the vehicle indicates that no occupant of the vehicle is or will drive the vehicle. In some aspects, changing to the driverless configuration includes changing a facing direction of at least one seat in the vehicle.

Some aspects may further include modifying the arrangement of the vehicle internal structure in accordance with the configuration change input or indication, which includes changing to a driven configuration in response to determining that an occupant is driving or will drive the vehicle. In some aspects, changing to the driven configuration may include changing at least one of an orientation of a steering wheel or a direction a seat in the vehicle faces. Some aspects include selecting one of a plurality of configuration alternatives based on the occupancy status in response to determining that the occupancy status of the vehicle does not conflict with the occupancy status allowed for in the configuration called for by the configuration change input or indication. Some aspects include selecting one of a plurality of configuration alternatives based on a predicted occupancy status of the vehicle determined in response to determining that the predicted occupancy status of the vehicle will not conflict with the occupancy status allowed for in the configuration called for by the configuration change input or indication.

Further aspects include a vehicle including a processor configured to perform operations of any of the methods summarized above. Further aspects include an exterior shape modification device configured for use in a vehicle and to perform operations of any of the methods summarized above. Further aspects include a vehicle interior structure configuration modification device configured for use in a vehicle and to perform operations of any of the methods summarized above. Further aspects include a vehicle having means for performing functions of any of the methods summarized above. Further aspects include a non-transitory processor-readable media having stored thereon processor-executable instructions configured to cause a processor of a vehicle to perform operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given and the detailed description, serve to explain the features herein.

DETAILED DESCRIPTION

Figure 1A:
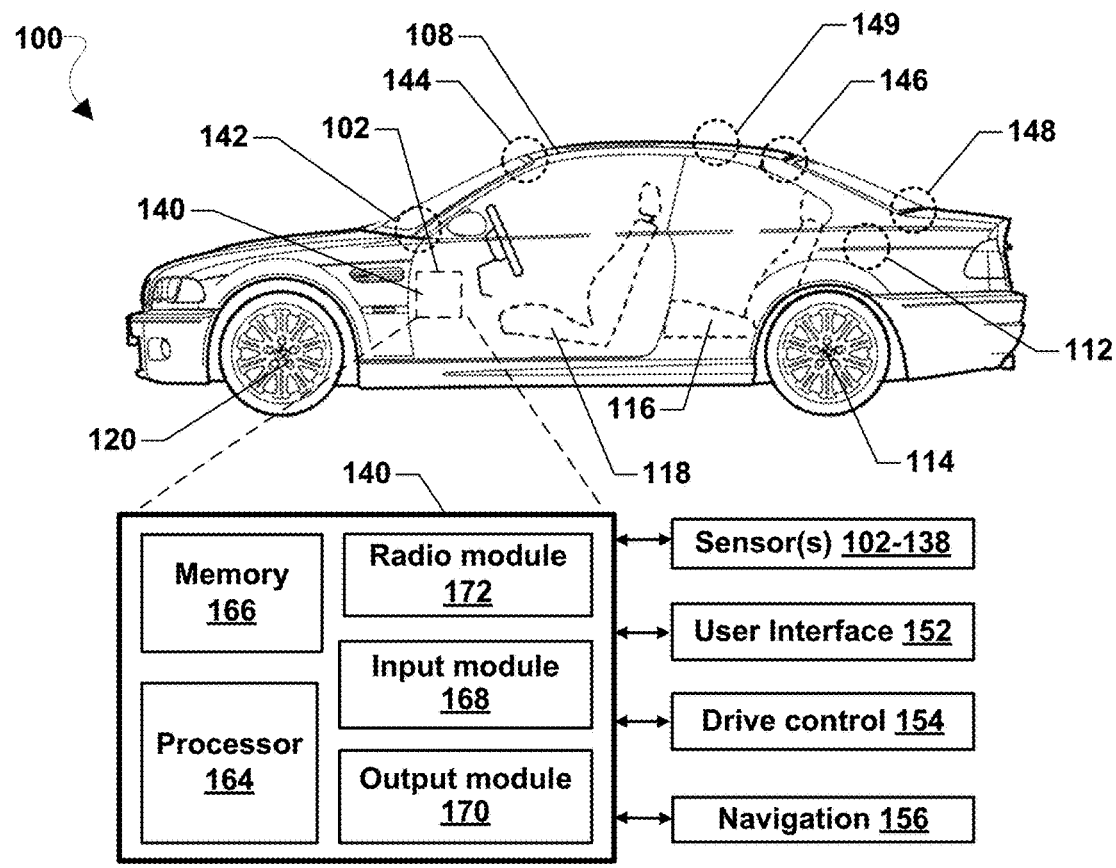
FIGS. 1A and 1B are schematic diagrams illustrating a vehicle suitable for implementing various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include vehicles and methods of operating such vehicles that enable the modification of a vehicle exterior shape and/or interior component configuration into a driver-less and/or passenger-less operating mode when a driver or passengers are not present. In some embodiments, a vehicle processor may determine whether to implement a configuration change to an exterior shape of a body of the vehicle and/or a configuration of current parts that make up a vehicle internal structure. In some embodiments, the vehicle processor may determine that a configuration change should be made in response in anticipation of an upcoming change in operating mode by receiving instructions from an operator and/or a vehicle system, such as a navigation system, a route planning system, a scheduling system, etc. In some embodiments, the vehicle processor may determine whether to implement a configuration change to the exterior shape of the vehicle in response to a planned or predicted future operating mode, event or environment. In some embodiments the vehicle processor may determine an occupancy status of the vehicle and determine whether the indicated configuration change will conflict with the occupancy status. If the indicated configuration change calls for a reconfiguration of vehicle parts that is different from the current configuration and does not conflict with the vehicle occupancy status (e.g., a conflict would exist if the vehicle configuration change input called for a no-occupant configuration but there are occupants in the vehicle), then actuators may be activated to implement the configuration change. In some embodiments, a future or anticipated vehicle configuration change indication may be received from a scheduling or navigation function, such as an indication that a vehicle configuration change will be required to enable the vehicle to change to a driven operational mode (e.g., change to a driven configuration from a driverless configuration) or to a driver-less operational mode (e.g., change to a driverless configuration from a passenger-less configuration) in time to receive a driver or other occupant to avoid or minimize wait time.

When no occupants are present in a vehicle, constraints such as a minimum headroom or cabin size may no longer be applicable. Similarly, even when there are one or more occupants present in the vehicle, if none of the occupants elect to drive (i.e., the vehicle operates autonomously) a change of an exterior shape of the vehicle may be desirable to accommodate different seating arrangements inside the vehicle in a driverless operating configuration. Additionally, various electronic and mechanical components of the vehicle may be disabled or changed to take advantage of the fact that the vehicle has no occupants (e.g., in a passenger-less operating mode) or that no occupant has elected to drive (e.g., in a driverless operating mode).

Modifying the configuration of the vehicle when there is no driver to a driverless mode may increase interior volume, improve use of the interior volume by passengers (and/or cargo), improve vehicle efficiency, etc. Modifying the configuration of the vehicle when there is no person present to a passenger-less mode may increase interior volume for storage of cargo, improve vehicle efficiency (e.g., by modifying the aerodynamic shape of the vehicle, by modifying an exterior shape of the vehicle, modifying driving parameters, and/or the like). For example, lowering the roof and changing the angle of front and rear windows may reduce aerodynamic drag when in the passenger-less mode, thereby improving vehicle fuel efficiency. Various embodiments enable such changes in vehicle configurations in driverless and passenger-less operating modes to be accomplished automatically or semi-automatically with safety features to avoid injuring passengers. Some embodiments enable changing back to driver and/or passenger mode in anticipate of receiving a driver or passenger, thereby improving the user experience).

In various embodiments, the modification to the configuration of the vehicle to a driven configuration, a driverless mode and/or a passenger-less mode may occur at almost any time if warranted. For example, the modification to the driven configuration, the driverless mode, and/or the passenger-less mode may be performed while the vehicle is stationary (i.e., at a stop or parked) or while moving (i.e., in motion on or off road).

As used herein, the expression the "driven configuration" refers to a conventional configuration in which a driver sits in the driver's seat of the vehicle and may either drive the vehicle or monitor autonomous driving operations. In the driven configuration, there should be room for at least a driver to occupy. For example, a position of a steering wheel, accelerator, brake pedal, and/or other vehicle component may be changed to enable a driver to operate the vehicle. The particular vehicle components reconfigured into the driven configuration may be optional and may depend on the vehicle and the reconfiguration of some components may be optional. For example, a vehicle that provides automated acceleration/braking while allowing occupant steering may reconfigure a steering wheel without repositioning an accelerator and/or brake pedal. Other optional implementations are possible and contemplated within the scope of various claims.

As used herein, the expressions "driver-less configuration" and "driver-less mode" refer to a vehicle configuration in which passengers occupy the vehicle, but no one is driving (i.e., the vehicle is operating autonomously). In the driverless configuration, there should be room for at least one passenger to occupy the vehicle.

As used herein, the expressions "no-occupant configuration" and "passenger-less mode" refer to a vehicle configuration in which there are no occupants inside the vehicle, and thus no need to provide various accommodations (e.g., room, seating, safety features, etc.) for passengers or a driver. In accordance with various embodiments, there may be more than one of each of the driven, driverless, and no-occupant configurations. In various embodiments, in addition to the driven configuration, a vehicle may be configured with only a no-occupant configuration, a driver-less configuration, or both.

As used herein, the expression "an exterior shape of a body of a vehicle" refers to the external form or physical appearance characteristic of the parts forming the outer structure of the vehicle. A modification of the exterior shape of the body of the vehicle includes a change to a configuration of some parts forming the outer structure and may alter an outline or silhouette of the vehicle.

As used herein, the expression "an interior component configuration" refers to an arrangement of some parts forming the inner structural components of the vehicle. A modification of the interior component configuration of the vehicle may include a change to an arrangement of one or more of the parts forming the inner structural components, such as seats, ceilings, arm rests, steering wheels, etc.

As noted above, in some embodiments the configuration change to the exterior shape of the body of the vehicle may be based on a planned or predicted future operating mode, event or environment. As used herein, the expression "a planned or predicted future operating mode, event or environment" refers to something that is anticipated or planned to happen or conditions that are anticipated or predicted to occur at a later time, and may be based on schedules, navigation planning, sensor detections, observations, and/or deduction, particularly something of significance to a vehicle.

Figure 1B:
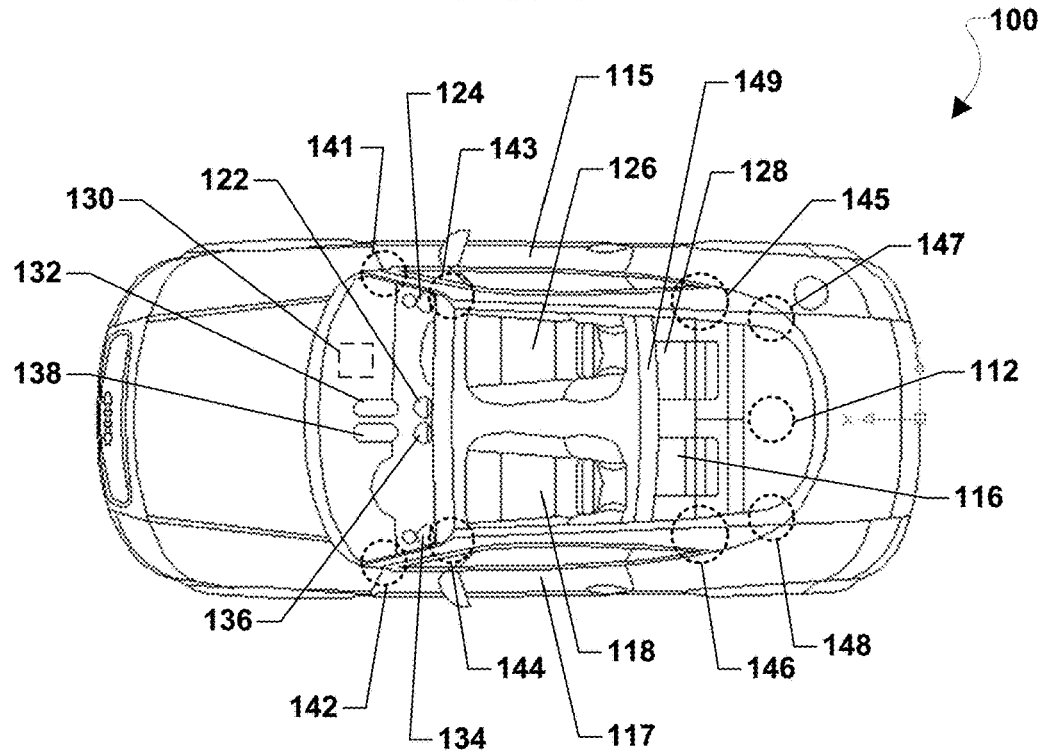

Various embodiments may be implemented within a variety of autonomous and semi-autonomous vehicles equipped with structures and actuators configured to change the vehicle's exterior and/or interior shape or configuration based on an occupancy status. With reference to FIGS. 1A and 1B, a vehicle 100 may include a plurality of sensors 102-138 disposed in or on the vehicle that are used for various purposes involved in autonomous and semiautonomous navigation as well as sensor data regarding objects and people in or on the vehicle 100. The sensors 102-138 may include one or more of a wide variety of sensors capable of detecting a variety of information useful for navigation, collision avoidance, and vehicle occupancy. Each of the sensors 102-138 may be in wired or wireless communication with a control unit 140, as well as with each other. In particular, the sensors may include one or more cameras 122, 136 or other optical sensors or photo optic sensors. The sensors may further include other types of object detection and ranging sensors, such as radar 132, lidar 138, infrared (IR) sensors, and/or ultrasonic sensors. The sensors may further include tire pressure sensors 114, 120, humidity sensors, temperature sensors, satellite geo-positioning sensors 108, accelerometers, vibration sensors, gyroscopes, gravimeters, impact sensors 130, force meters, stress meters, strain sensors, fluid sensors, chemical sensors, gas content analyzers, pH sensors, radiation sensors, Geiger counters, neutron detectors, biological material sensors, microphones 124, 134, occupancy sensors 112, 116, 118, 126, 128, door sensors 115, 117, proximity sensors, and/or other sensors.

In accordance with various embodiments, the vehicle 100 may include actuators 141-149, which may be used to modify an exterior shape of a body and/or an interior configuration of the vehicle 100 consistent with whether a driver and/or one or more passengers are present. Each of the actuators 141-149 may be a component used to move and control parts of the vehicle 100, such as exterior or internal structures. The actuators 141-149 may include hydraulics, hinges, drive motors, sensors, etc. For example, the windshield may be framed on opposite sides by right and left roof posts that each have base actuators 141, 142 and upper actuators 143, 144 for changing an inclination angle of the windshield.

In various embodiments, the actuators 141-149 may be used to change a shape, length, and/or orientation of various exterior parts of the vehicle, including (but not limited to) the frame, one or more pillars, the hood, the roof, the trunk, the windshield, side windows, side-view mirrors, rear window, side panels, floorboards, fenders, etc. For example, base and upper actuators 141, 142, 143, 144 may pivot and/or slide adjacent parts relative to one another to enable changing an angle of the windshield. Similarly, the rear window may be framed on opposite sides by right and left roof posts that each have base actuators 147, 148 and upper actuators 145, 146. The base and upper actuators 145, 146, 147, 148 may pivot and/or slide adjacent parts relative to one another for changing an angle of the rear window. In addition, the roof may include roof retractor actuators 149 that may be used to change a length or shape of the roof.

In various embodiments, the actuators 141-149 may be used to change a shape, length, and/or orientation of various interior parts of the vehicle, including (but not limited to) seats, steering wheels, pedals, arm rests, visual aids (e.g., rearview mirror or external camera), controls and other interior equipment. For example, actuators coupled to or included within the seats may be configured to rotate seats in a driverless mode, and/or cause seats to fold or flatten in a passenger-less mode to increase interior volume and accommodate changes in the external shape of the vehicle.

In various embodiments, the actuators 141-149 may be any device or element configured to move, change, and/or operate another device or element of the vehicle 100. The actuators 141-149 may include or work to activate smart materials configured to change shape. For example, smart materials may be configured to change from having a smooth outer surface to having a dimpled outer surface (e.g., like a golf ball), which may improve or alter vehicle aerodynamics. The smart materials may be activated by electrical or other stimulus configured to cause the smart materials to change shape in a controlled manner (e.g., from a flat/smooth surface to a surface having a series of dimples on the exterior thereof). For example, the use of smart materials to create dimpling on exterior surfaces of the vehicle may be implemented on any surface that is exposed to airflow while moving, such as on the windshield, on the hood, roof and trunk, on side panels, on side windows, exterior rearview mirrors (if deployed), moonroof, etc.

The vehicle control unit 140 may include a processor 164 that is configured with processor-executable instructions to perform various embodiments using information received from various inputs including a user interface 152, radio module 172, and/or sensors 102-138, including the cameras 122, 136, microphones 124, 134, door sensors 115, 117, and occupancy sensors 112, 116, 118, 126, 128. The control unit 140 or its processor 164 may be configured to receive occupancy information from the sensors 102-138, which the control unit or its processor may use to determine an occupancy status of the vehicle 100. In addition, the control unit 140 or its processor may be communicatively coupled to the actuators 141-149 and configured to activate the actuators 141-149 to change an exterior shape or interior configuration of the vehicle 100 when appropriate. For example, the control unit 140 may change an exterior shape or interior configuration based on some external stimulus or condition, such as electricity, light, temperature, pH, stress, moisture, etc. The control unit 140 or its processor 164 may further be configured to control steering, breaking and speed of the vehicle 100 consistent with either a passenger-less or normal operating mode using information regarding other vehicles determined using various embodiments. The control unit 140 or its processor 164 may be communicatively coupled to the actuators 141-149 through wired (e.g., electrical and/or optical) and/or wireless connections. The communicative coupling may be through one or more intermediate connectors (e.g., a bus) or through a direct coupling.

The control unit 140 processor 164 may be configured with processor-executable instructions to control shape changing, maneuvering, navigation, and other operations of the vehicle 100, including operations of various embodiments. The processor 164 may be coupled to a memory 166. The control unit 140 may include an input module 168, an output module 170, and a radio module 172 that may each be coupled to the processor 164.

The radio module 172 may be configured for wireless communication. The radio module 172 may exchange signals (e.g., command signals for controlling shape changes, maneuvering, signals from navigation facilities, etc.) with a network transceiver, and may provide the signals to the processor 164 and/or the navigation components 156. The signals may be used by the radio module 172 to receive shape change commands and/or input. In some embodiments, the radio module 172 may enable the vehicle 100 to communicate with a wireless communication device through a wireless communication link. The wireless communication link may be a bidirectional or unidirectional communication link and may use one or more communication protocols.

The input module 168 may receive configuration change inputs from the user interface 152 or the radio module 172. In addition, the input module 168 may receive sensor data from one or more vehicle sensors as well as electronic signals from other components, including the user interface 152, the drive control components 154, and the navigation components 156. In some embodiments, the input module 168 may be configured to determine when a driver and/or passengers are not present in the vehicle, and generate the configuration change input based on such determinations. In some embodiments, the input module 168 may be configured to receive information from navigation components 156 and other components (e.g., a scheduling unit) and determine when a change in configuration is anticipated (e.g., changing to the passenger mode upon arriving at a destination to pick up a passenger or changing to a passenger-less mode upon arriving at a destination to pick up cargo) so that the configuration change can be started in time to be completed by the time that the new configuration is appropriate.

The output module 170 may be used to communicate with or activate various components of the vehicle 100, including the drive control components 154, the navigation components 156, and the sensor(s) 158.

The control unit 140 or its processor 164 may be coupled to and configured to control various of the drive control components 154, navigation components 156, and one or more vehicle sensors 102-138 of the vehicle 100. The drive control components 154 may be used to control physical elements of the vehicle 100 that effect maneuvering and navigation of the vehicle, such as the engine, motors, throttles, steering elements, flight control elements, braking or deceleration elements, and the like. The drive control components 154 may also include components that control other devices of the vehicle, including environmental controls (e.g., air conditioning and heating), external and/or interior lighting, interior and/or exterior informational displays (which may include a display screen or other devices to display information), and other similar devices.

While the control unit 140 is described as including separate components, in some embodiments some or all of the components (e.g., the processor 164, the memory 166, the input module 168, the output module 170, and the radio module 172) may be integrated in a single processor device or module, such as a system-on-chip (SOC) processing device. Such an SOC processing device may be configured for use in vehicles and be configured, such as with processor-executable instructions executing in the processor 164, to perform operations of various embodiments when installed into a vehicle.

Figure 2:
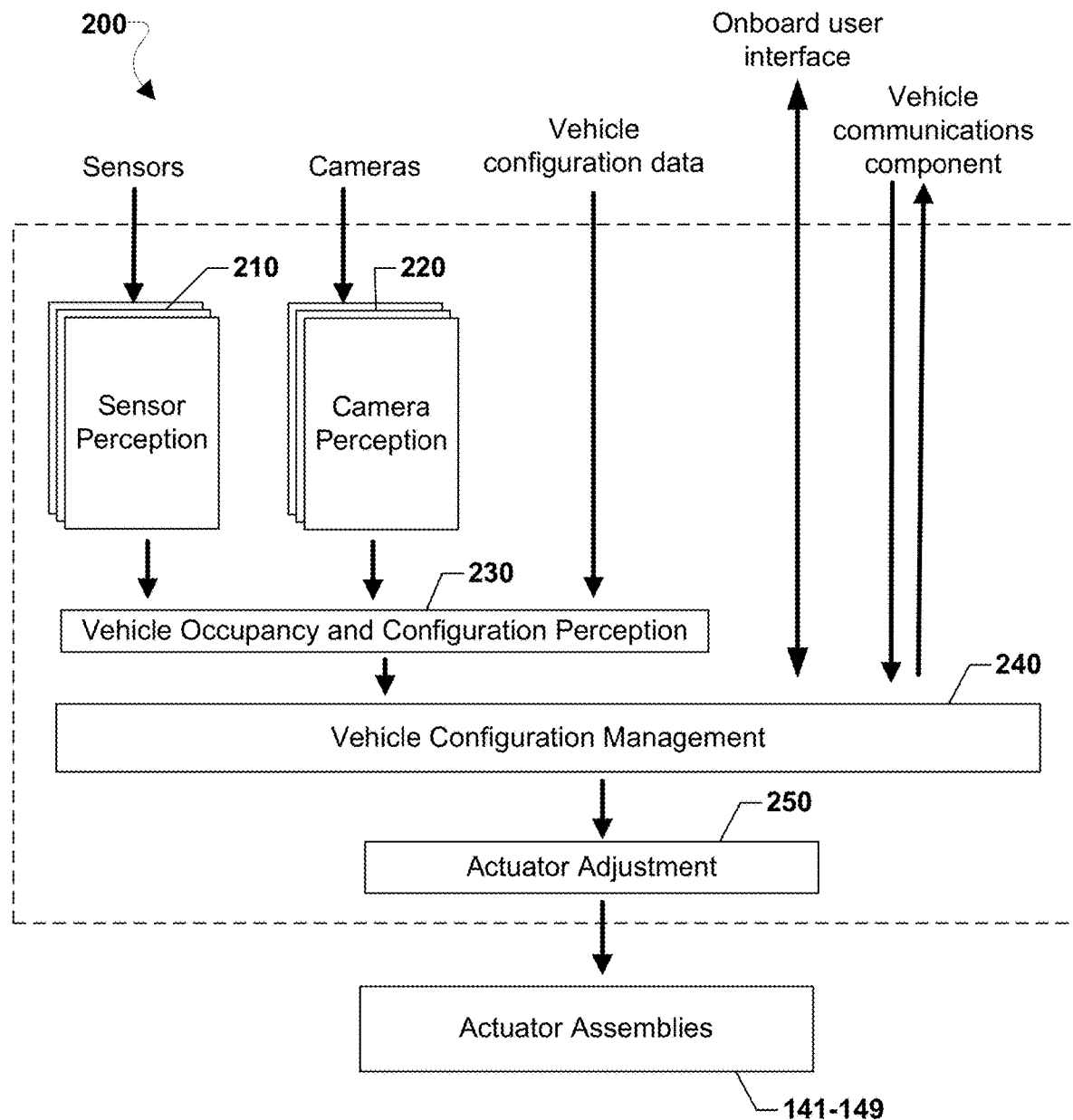
FIG. 2 is a schematic block diagram illustrating components of an example vehicle management system according to various embodiments.

FIG. 2 illustrates an example of subsystems, computational elements, computing devices or units within a vehicle management system 200, which may be utilized within a vehicle 100 implementing various embodiments. With reference to FIGS. 1A-2, in some embodiments, the various computational elements, computing devices or units within vehicle management system 200 may be implemented within a system of interconnected computing devices (i.e., subsystems), that communicate data and commands to each other (e.g., indicated by the arrows in FIG. 2). In other embodiments, the various computational elements, computing devices or units within vehicle management system 200 may be implemented within a single computing device, such as separate threads, processes, algorithms or computational elements. Therefore, each subsystem/computational element (e.g., illustrated in FIG. 2) is also generally referred to herein as "layer" within a computational "stack" that constitutes the vehicle management system 200. However, the use of the terms layer and stack in describing various embodiments are not intended to imply or require that the corresponding functionality is implemented within a single autonomous (or semi-autonomous) vehicle control system computing device, although that is a potential implementation embodiment. Rather the use of the term "layer" is intended to encompass subsystems with independent processors, computational elements (e.g., threads, algorithms, subroutines, etc.) running in one or more computing devices, and combinations of subsystems and computational elements.

In various embodiments, the vehicle management system 200 may include a sensor perception layer 210, a camera perception layer 220, a vehicle occupancy and configuration perception layer 230, a vehicle configuration management layer 240, and an actuator adjustment layer 250. The layers 210-250 are merely examples of some layers in one example configuration of the vehicle management system 200 and in other configurations other layers may be included, such as additional layers for other perception sensors (e.g., vehicle load sensors, etc.) or safety and non-occupancy confirmation, and/or certain of the layers 210-250 may be excluded from the vehicle management system 200. Each of the layers 210-250 may exchange data, computational results and commands (e.g., as illustrated by the arrows in FIG. 2).

The vehicle management system 200 may be configured to receive and process data from sensors (e.g., pressure, motion, inertial measurement units (IMU), etc.), cameras, vehicle databases/memory (e.g., storing vehicle configuration data), an onboard user interface, and vehicle communications component(s) (e.g., one or more wireless transceivers). The vehicle management system 200 may output actuator adjustment commands or signals to one or more actuators assemblies (e.g., 141-149), which are systems, subsystems, or computing devices that interface directly with exterior and interior vehicle parts/components configured to change shape/position when commanded to do so.

The sensor perception layer 210 may receive data from one or more sensors (e.g., occupancy sensors 102-138) and process the data to recognize and determine whether any occupants are currently in the vehicle, and if so where they are seated and whether they are driving the vehicle 100. Non-limiting examples of sensors that may be used as occupancy sensors 102-138 include weight/force sensors in the vehicle seats, sensors that may detect the presence of mobile computing devices within the vehicle (e.g., connecting through Bluetooth, WiFi, vehicle hotspot, etc.), mechanical devices (e.g., a vehicle button, handle, pedal, and/or knob that may be manipulated and provides an indication that a person occupies the vehicle), and/or voice recognition systems (e.g., an occupant verbally indicating presence). In addition, the sensor perception layer 210 may receive data from one or more other sensors configured to detect a current position/configuration of vehicle parts and process the data to recognize and/or confirm the current position/configuration of one or more vehicle parts. The sensor perception layer 210 may use neural network processing and artificial intelligence methods to recognize occupants, objects, and/or the position/configuration of vehicle parts. In addition, the sensor perception layer 210 may be configured to pass any vehicle occupancy data and/or current vehicle parts configuration data along to the vehicle occupancy and configuration perception layer 230.

The camera perception layer 220 may receive data from one or more cameras (e.g., 122, 136) and process the data to recognize and determine whether any occupants are currently in the vehicle and if so, where they are seated and whether they are driving the vehicle 100. In addition, the camera perception layer 220 may receive data from one or more cameras configured to detect a current position/configuration of vehicle parts, and process the data to recognize and/or confirm the current position/configuration of one or more vehicle parts. The camera perception layer 220 may use neural network processing and artificial intelligence methods to recognize occupants, objects, and/or the position/configuration of vehicle parts. In addition, the camera perception layer 220 may be configured to pass any vehicle occupancy data and/or current vehicle parts configuration data along to the vehicle occupancy and configuration perception layer 230.

The vehicle occupancy and configuration perception layer 230 may receive and/or access vehicle occupancy inputs from the sensor perception layer 210 and the camera perception layer 220 for determining an occupancy status of the vehicle. The vehicle occupancy and configuration perception layer 230 may compare and use any redundant vehicle occupancy input received from the sensor perception layer 210 and/or the camera perception layer 220 to ensure any determined vehicle occupancy status is accurate. The vehicle occupancy and configuration perception layer 230 may be configured to feed any determined vehicle occupancy data to the vehicle configuration management layer 240.

In addition, the vehicle occupancy and configuration perception layer 230 may also receive and/or access vehicle parts configuration inputs from the sensor perception layer 210 and the camera perception layer 220 for determining a current parts configuration of the vehicle. The vehicle occupancy and configuration perception layer 230 may receive and/or access stored vehicle configuration data from one or more vehicle databases/memory that store information about the configuration and position of vehicle parts. The vehicle occupancy and configuration perception layer 230 may also compare the stored vehicle configuration data with other processed data from the sensor perception layer 210 and the camera perception layer 220, to determine/confirm a true current position and/or orientation of vehicle parts. The vehicle occupancy and configuration perception layer 230 may also be configured to feed the determined current vehicle parts configuration data to the vehicle configuration management layer 240.

The vehicle configuration management layer 240 may access or automatically receive vehicle information, including any determined vehicle occupancy status and/or vehicle parts configuration data, from the vehicle occupancy and configuration perception layer 230. In addition, the vehicle configuration management layer 240 may receive a configuration change input from an onboard user interface. For example, the vehicle's dashboard may include the onboard user interface, which may have one or more buttons or a touch screen display configured to receive occupant commands for initiating the modification of the vehicle's shape. Also, the vehicle configuration management layer 240 may receive a vehicle occupancy input from a vehicle communications component (e.g., radio module 172), wired connection, or other electronic connection to an occupant's onboard mobile device (e.g., cell phone, smart watch, tablet, computer, etc.) or other computing device remote from the vehicle.

In response to receiving a configuration change input for the vehicle to change shape, the vehicle configuration management layer 240 may determine whether an exterior shape of a body of the vehicle and/or an interior configuration of the vehicle needs to change consistent with an operating mode (e.g., driverless mode, passenger-less mode, cargo mode, passenger mode, etc.). This determination may be made at least in part based on the received vehicle occupancy status and the received vehicle parts configuration data. The determination as to whether the exterior shape of the body and/or an interior configuration of the vehicle should be changed may take into account the determined vehicle occupancy data and the determined current vehicle parts configuration data received from the vehicle occupancy and configuration perception layer 230, as well as one or more vehicle inputs from the onboard user interface and/or the vehicle communications component. If the exterior shape of the body of the vehicle does not need to change, the vehicle configuration management layer 240 need not signal the actuator adjustment layer 250 to activate actuators assemblies 141-149 associated with exterior components. If the exterior shape of the body of the vehicle is to be changed, the vehicle configuration management layer 240 may signal the actuator adjustment layer 250 to activate select actuators (e.g., 141-149) and/or a sequence of actuators configured to change the exterior shape of the body of the vehicle accordingly, which may include modifying the configuration of internal structures (e.g., lowering seat backs to enable lowering the roof). Similarly, if an interior configuration of the vehicle is to be changed (e.g., lowering or stowing seats in the passenger-less mode or raising/unfolding seats in the passenger mode), the vehicle configuration management layer 240 may activate select actuators and/or a sequence of actuators configured to change the configuration of internal structures.

In an example scenario, the vehicle configuration management layer 240 may receive a configuration change input from an onboard user interface or a vehicle communications component. The received configuration change input may represent instructions to change the interior configuration of components and/or the exterior shape of the body of the vehicle from a one configuration (e.g., the driven configuration) to another configuration (e.g., the driverless configuration). For example, the vehicle may be occupied by a driver and one or more passengers, but the driver has decided to allow the vehicle to operate autonomously and has activated an application (e.g., from a device, such as mobile communication device or the like) that sent a configuration change input directing the vehicle to change shape and reconfigure internal components accordingly. In response to receiving the configuration change input, the vehicle configuration management layer 240 may pull a vehicle occupancy input and current vehicle parts configuration information from the vehicle occupancy and configuration perception layer 230. To provide the vehicle occupancy input and the current vehicle parts configuration information, the vehicle occupancy and configuration perception layer 230 may access vehicle occupancy input and/or vehicle parts configuration data from the sensor perception layer 210, the camera perception layer 220, and/or stored vehicle configuration data. Based on the information received from the vehicle occupancy and configuration perception layer 230 (i.e., vehicle occupancy data and the current vehicle parts configuration data), the vehicle configuration management layer 240 may determine what actuators need to be or should be activated (or to otherwise effectuate) to change or reconfigure internal components and/or the exterior shape of the body of the vehicle. Thereafter, the vehicle configuration management layer 240 may activate select actuators configured to modify the vehicle accordingly, if appropriate.

In a second scenario, the sensor perception layer 210 may receive data from a door sensor (e.g., 117) indicating that the door has been opened or unlocked. The sensor perception layer 210 may translate this received data into an inferred configuration change input indicating that a person may be about to enter the vehicle. Opening or unlocking a door may also be interpreted as a configuration change input that means the vehicle should be in a configuration suitable for occupants (i.e., a driver or one or more passengers). The sensor perception layer 210 may also determine based on the position or orientation of various actuators or moveable components that the vehicle is presently in a passenger-less mode or no-occupant configuration. In some embodiments, the camera perception layer 220 may receive an image from an onboard camera and process the image to determine that the vehicle is in a no-occupant configuration that is not suitable for occupants. The vehicle parts configuration data from the camera may be passed to the vehicle occupancy and configuration perception layer 230. In response to such inputs and vehicle configuration data, the vehicle occupancy and configuration perception layer 230 may compare the indication that the vehicle is in a no-occupant configuration to vehicle configuration data stored in an onboard memory that confirms the vehicle was recently placed in a no-occupant configuration (i.e., the roof was lowered). The vehicle occupancy and configuration perception layer 230 may pass the inferred configuration change input (i.e., indicating that the vehicle should be configured to receive an occupant) and the current vehicle parts configuration (i.e., indicating that the vehicle is in a no-occupant configuration) to the vehicle configuration management layer 240. Based on the received vehicle occupancy data and the current vehicle parts configuration data, the vehicle configuration management layer 240 may identify the actuators that need to be activated, and in what order, in order to change the configuration of interior components and/or the exterior shape of the body of the vehicle out of the no-occupant configuration, such as to a driven or a driverless configuration. Thereafter, the vehicle configuration management layer 240 may activate select actuators so as to change the configuration of interior components and/or the exterior shape of the body of the vehicle to receive an occupant.

In a third scenario, the sensor perception layer 210 may receive data indicating that the vehicle is unoccupied and being operated autonomously. Accordingly, the vehicle configuration management layer 240 may transition to the passenger-less mode by activating select actuators configured to change the configuration of interior components and/or the exterior shape of a body of the vehicle to a no-occupant configuration. Transitioning to the passenger-less mode may also involve making changes the vehicle configuration management layer 240 (or in a separate layer not shown) to the navigation and control parameters for operating the vehicle autonomously, such as changing maximum or minimum operating speeds, adjusting turn rate limits, adjusting breaking rates, adjusting minimum vehicle separation distances, accessing roadways limited to passenger-less vehicle travel, etc.

In a fourth scenario, the vehicle configuration management layer 240 may receive a configuration change input representing instructions to operate in the driverless configuration (e.g., operating autonomously with no vehicle occupant driving or the vehicle is unoccupied). In response to receiving the configuration change input, the vehicle configuration management layer 240 may transition to the driverless configuration. The vehicle configuration management layer 240 may pull a vehicle occupancy input and current vehicle parts configuration information from the vehicle occupancy and configuration perception layer 230. Based on the information received from the vehicle occupancy and configuration perception layer 230 (i.e., vehicle occupancy data and the current vehicle parts configuration data), the vehicle configuration management layer 240 may (directly or indirectly) activate or control the actuators required to reconfigure the exterior shape of the body of the vehicle and/or internal components consistent with the configuration change input. For example, the vehicle configuration management layer 240 may control actuators that cause dimpling of exterior surfaces of the vehicle, including the windshield and other windows. Alternatively, the vehicle configuration management layer 240 may control actuators that position a cover or shield having a dimpled outer surface over part of the windshield or other windows, mirrors, or other exterior surfaces. When the vehicle is operating autonomously, there may be no need for a driver or any occupant to clearly see where the vehicle is going. Thus, dimpling of the windshield or other windows, which may obscure or block the view from the vehicle, may be used to provide better aerodynamics when the vehicle is operating in the driverless configuration.

In a fifth scenario, the vehicle configuration management layer 240 may receive a configuration change input representing instructions to operate in a platooning mode. As used herein the terms "platoon" or "platooning" refer to two or more vehicle driving together in a relatively close formation. Platooning vehicles may operate with smaller than usual distances between vehicles and even optionally couple to one another (e.g., mechanically and/or electromagnetically). In some embodiments, more than one platooning mode may be available, such as an occupied platooning mode (i.e., platooning with passengers onboard) and a passenger-less platooning mode (i.e., no occupants). Thus, in response to receiving the configuration change input associated with the platooning mode, the vehicle configuration management layer 240 may obtain a vehicle occupancy input and current vehicle parts configuration information from the vehicle occupancy and configuration perception layer 230. To provide the vehicle occupancy input and the current vehicle parts configuration information, the vehicle occupancy and configuration perception layer 230 may access vehicle occupancy input and/or vehicle parts configuration data from the sensor perception layer 210, the camera perception layer 220, and/or stored vehicle configuration data. Based on the information received from the vehicle occupancy and configuration perception layer 230 (i.e., vehicle occupancy data and the current vehicle parts configuration data), the vehicle configuration management layer 240 may (directly or indirectly) activate or control the actuators required to reconfigure the exterior shape of the body of the vehicle and/or internal components consistent with the configuration change input and optionally the occupancy status to the platooning mode and/or the appropriate platooning mode if there is more than one.

In some embodiments, settings for configurations for the platooning mode(s) may include adjusting the exterior shape and/or the interior of the vehicle, such as, for example, retracting sideview mirrors for tighter vehicle-to-vehicle travel formations. The occupied platooning mode may include darkening all the vehicle windows so vehicle occupants may have privacy from occupants of other vehicles and/or so vehicle occupants do not feel anxious about their vehicle driving relatively close to another vehicle. As another non-limiting example, the platooning mode may include modifying an aerodynamic profile (e.g., adjusting the exterior shape of the vehicle in a manner that affects drag) of the vehicle. Additionally, due to restrictions on exterior shape changes or internal structural changes when the vehicle is occupied, more than one aerodynamic profile may be available for the vehicle based on occupancy status. For example, a first aerodynamic profile (e.g., less aerodynamic to make room for passengers) may be implemented for an occupied platooning mode, and a second aerodynamic profile (e.g., more aerodynamic) may be implemented for a passenger-less platooning mode.

In some embodiments, the settings for configurations for the platooning mode(s) may be based on the positioning of the vehicle relative to the other vehicles in the platoon. For instance, a vehicle in the platoon may use a first exterior shape (or first aerodynamic profile) when at the front of the platoon and change to a second exterior shape (or second aerodynamic profile), which is different from the first exterior shape, if the same vehicle is positioned elsewhere in the platoon (e.g., middle or rear of the platoon). In further embodiments, the vehicle may be configured to change exterior shape (and/or the interior structure of the vehicle) in response to changes in the vehicle's positioning to other vehicles in the platoon (e.g., change from the first exterior shape to the second exterior shape when the vehicle moves from the front to some other location (e.g., middle, rear, left side, right side, etc.) in the platoon. In addition, such changes in the exterior shape (and/or the interior structure) based on a vehicle's position in the platoon may also consider the occupancy status of the vehicle to provide an occupied platooning mode and a passenger-less platooning mode.

In some embodiments, the settings for configurations for the platooning mode may be based on the exterior shape of one or more of the other vehicles in the platoon. The exterior shape of the one or more other vehicles may be based on the type of vehicles (e.g., compare shapes of a sports utility vehicle (SUV), pickup truck, semi-truck, bus, sedan, motorcycle, etc.), the size of vehicles, the aerodynamic profile of the vehicles, and/or the like. For instance, a vehicle in the platoon may use a first exterior shape (or first aerodynamic profile) when positioned near a vehicle with a first type of exterior shape (e.g., an SUV) and change to a second exterior shape (or second aerodynamic profile), which is different from the first exterior shape, when positioned near a vehicle with a first type of exterior shape (e.g., a sedan). In further embodiments, the vehicle may be configured to change exterior shape (and/or the interior of the vehicle) in response to changes in the presence or absence of the one or more other vehicles (e.g., change from the first exterior shape to the second exterior shape when the other vehicle is replaced or overtaken by a different other vehicle having a different exterior shape. In some embodiments, the vehicle may be configured to change exterior shape (and/or the interior of the vehicle) in response to the distance (and/or speed) of one or more of the other vehicles in the platoon. Thus, for instance, as the distance between the vehicle and the one or more other vehicles changes, the impact caused by the one or more vehicles accordingly changes (e.g., aerodynamic impact changes. For example, as the distance between the vehicle and the one or more other vehicles changes, the vehicle's windows may become more transparent because privacy (and/or distraction to other vehicles) may be less of a concern.

Alternatively, configurations (i.e., modes) may be limited to use with particular other configurations. For example, the platooning mode may be restricted for use with a passenger-less mode to avoid vehicle occupants feeling anxious about traveling in a tight platoon formation. Other configurations may be available as well, such as a non-autonomous, semi-autonomous, driverless, sleeping/resting occupant(s), facing occupants, or vehicle charging configurations.

Individual vehicle systems may have different settings for separate configurations. For example, a rapid electric charging feature may operate differently depending upon the configuration in which it is activated. For example, when a vehicle is platooning, the rapid electric charging feature may have one speed of charging the battery when occupants are onboard and a higher speed for charging the battery when no occupants are onboard since electromagnetic emission levels need not be limited when no occupants are onboard.

In various embodiments, the vehicle management system 200 may include functionality that performs safety checks or oversight of various commands, planning or other decisions of various layers that could impact vehicle and occupant safety. Such safety checks or oversight functionality may be implemented within a dedicated layer (not shown) or distributed among various layers and included as part of the functionality. In some embodiments, a variety of safety parameters may be stored in memory and the safety checks or oversight functionality may compare a determined value (e.g., size and/or weights of occupants) to corresponding safety parameter(s), and issue a warning or command if the safety parameter is or will be violated. For example, a safety or oversight function in the vehicle configuration management layer 240 (or in a separate layer not shown) may determine whether it is safe to change a shape of the vehicle based on other factors, such as when the vehicle is moving or when another object or vehicle nearby is too close for the vehicle shape to expand.

Some safety parameters stored in memory may be static (i.e., unchanging over time), such as maximum/minimum vehicle height. Other safety parameters stored in memory (e.g., headroom) may be dynamic in that the parameters are determined or updated continuously or periodically based on the vehicle occupants.

Figure 3:
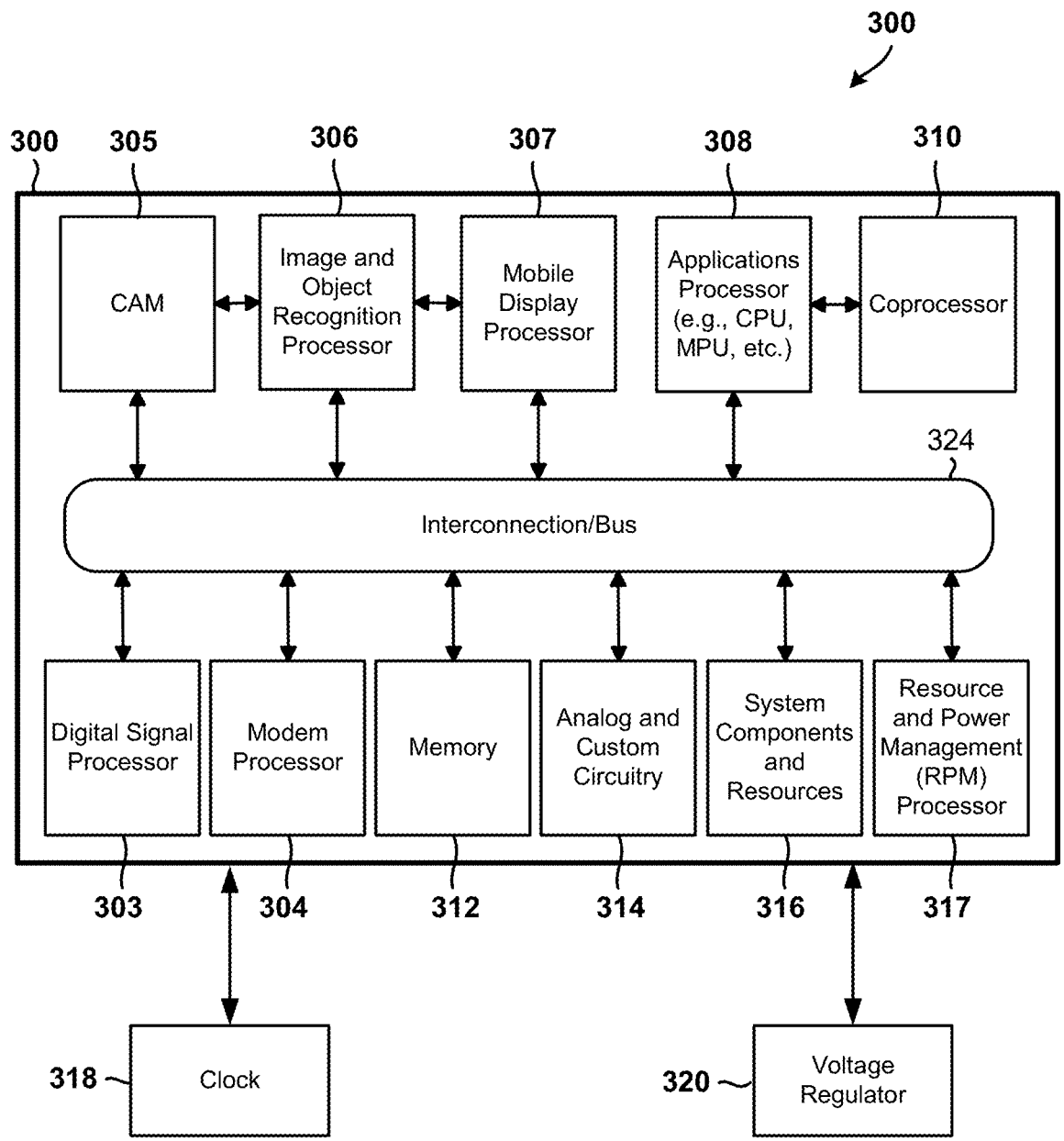
FIG. 3 is a schematic block diagram illustrating components of an example system on chip for use in a vehicle in accordance with various embodiments.

FIG. 3 illustrates an example system-on-chip (SOC) architecture of a processing device SOC 300 suitable for implementing various embodiments in vehicles. With reference to FIGS. 1A-3, the processing device SOC 300 may include a number of heterogeneous processors, such as a digital signal processor (DSP) 303, a modem processor 304, an image and object recognition processor 306, a mobile display processor 307, an applications processor 308, and a resource and power management (RPM) processor 317. The processing device SOC 300 may also include one or more coprocessors 310 (e.g., vector co-processor) connected to one or more of the heterogeneous processors 303, 304, 306, 307, 308, 317. Each of the processors may include one or more cores, and an independent/internal clock. Each processor/core may perform operations independent of the other processors/cores. For example, the processing device SOC 300 may include a processor that executes a first type of operating system (e.g., FreeBSD, LINUX, OS X, etc.) and a processor that executes a second type of operating system (e.g., Microsoft Windows). In some embodiments, the applications processor 308 may be the SOC's 300 main processor, central processing unit (CPU), microprocessor unit (MPU), arithmetic logic unit (ALU), etc. The graphics processor 306 may be graphics processing unit (GPU).

The processing device SOC 300 may include analog circuitry and custom circuitry 314 for managing sensor data, analog-to-digital conversions, wireless data transmissions, and for performing other specialized operations, such as processing encoded audio and video signals for rendering in a web browser. The processing device SOC 300 may further include system components and resources 316, such as voltage regulators, oscillators, phase-locked loops, peripheral bridges, data controllers, memory controllers, system controllers, access ports, timers, and other similar components used to support the processors and software clients (e.g., a web browser) running on a computing device.

The processing device SOC 300 also include specialized circuitry for camera actuation and management (CAM) 305 that includes, provides, controls and/or manages the operations of one or more cameras 122, 136 (e.g., a primary camera, webcam, 3D camera, etc.), the video display data from camera firmware, image processing, video preprocessing, video front-end (VFE), in-line JPEG, high definition video codec, etc. The CAM 305 may be an independent processing unit and/or include an independent or internal clock.

In some embodiments, the image and object recognition processor 306 may be configured with processor-executable instructions and/or specialized hardware configured to perform image processing and object recognition analyses involved in various embodiments. For example, the image and object recognition processor 306 may be configured to perform the operations of processing images received from cameras (e.g., 122, 136) via the CAM 305 to recognize and/or identify when a person or object occupies or is attempting to occupy the vehicle, as well as vehicle parts configurations, and otherwise perform functions of the camera perception layer (e.g., 220) as described. In some embodiments, the processor 306 may be configured to process sensor data and perform functions of the sensor perception layer (e.g., 210) as described.

The system components and resources 316, analog and custom circuitry 314, and/or CAM 305 may include circuitry to interface with peripheral devices, such as cameras (e.g., 122, 136), sensors, electronic displays, wireless communication devices, external memory chips, etc. The processors 303, 304, 306, 307, 308 may be interconnected to one or more memory elements 312, system components and resources 316, analog and custom circuitry 314, CAM 305, and RPM processor 317 via an interconnection/bus module 324, which may include an array of reconfigurable logic gates and/or implement a bus architecture (e.g., CoreConnect, AMBA, etc.). Communications may be provided by advanced interconnects, such as high-performance networks-on chip (NoCs).

The processing device SOC 300 may further include an input/output module (not illustrated) for communicating with resources external to the SOC, such as a clock 318 and a voltage regulator 320. Resources external to the SOC (e.g., clock 318, voltage regulator 320) may be shared by two or more of the internal SOC processors/cores (e.g., a DSP 303, a modem processor 304, a graphics processor 306, an applications processor 308, etc.).

In some embodiments, the processing device SOC 300 may be included in a control unit (e.g., 140) for use in a vehicle (e.g., 100). The control unit may include communication links for communication with a telephone network (e.g., through a network transceiver), the Internet, and/or a network server.

The processing device SOC 300 may also include additional hardware and/or software components that are suitable for collecting sensor data from sensors, including motion sensors (e.g., accelerometers and gyroscopes of an IMU), user interface elements (e.g., input buttons, touch screen display, etc.), microphone arrays, sensors for monitoring physical conditions (e.g., location, direction, motion, orientation, vibration, pressure, etc.), cameras, compasses, Global Positioning System (GPS) receivers, communications circuitry (e.g., Bluetooth®, WLAN, Wi-Fi, etc.), and other well-known components of modern electronic devices.

As used herein, the terms "component," "system," "unit," and the like include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a communication device and the communication device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

Figure 4A:
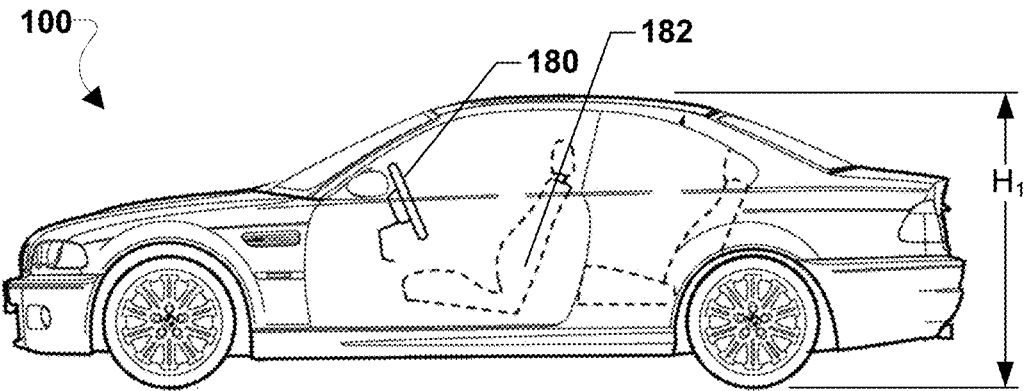
FIGS. 4A, 4B, and 4C are schematic diagrams of a vehicle reconfiguring internal components and modifying an external shape thereof from a driven configuration to a no-occupant configuration in accordance with various embodiments.
Figure 4B:
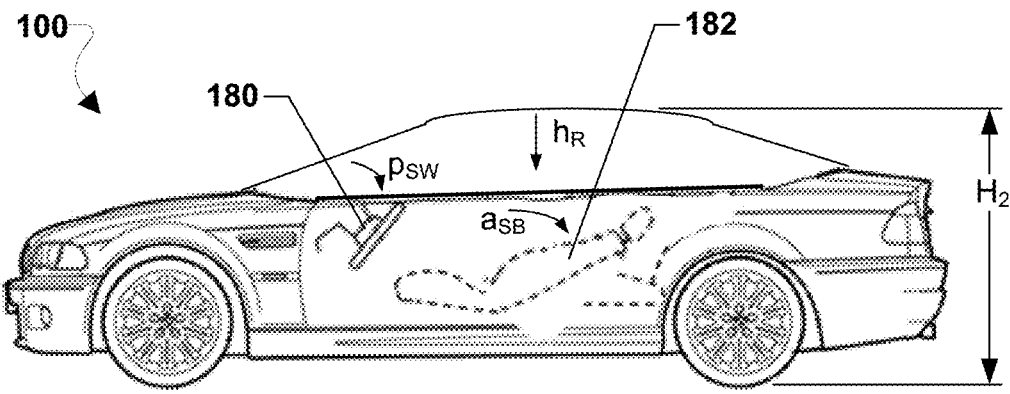
Figure 4C:
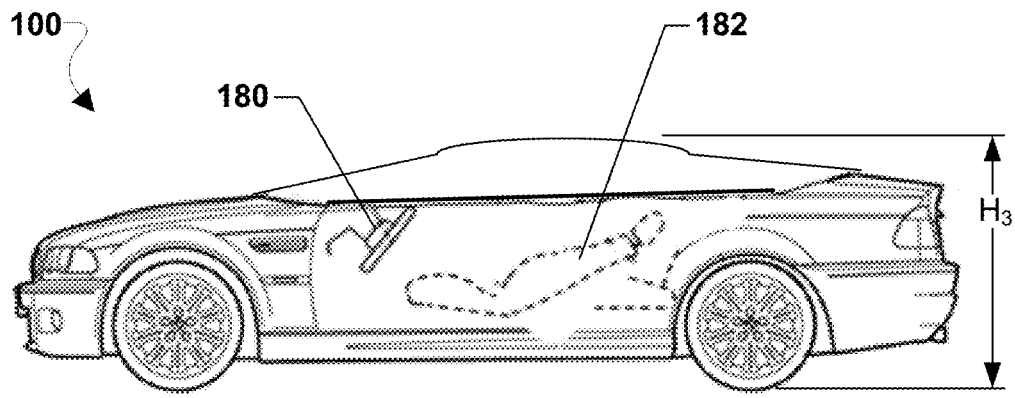

FIGS. 4A-4C illustrate a vehicle 100 having reconfigurable internal components and a modifiable exterior shape in accordance with various embodiments. With reference to FIGS. 1A-4C, a processor (e.g., 164) of the vehicle 100 may receive a configuration change input in the form of a command directing the vehicle 100 to change to a no-occupant configuration. For example, a vehicle owner that wants to direct the vehicle to drive itself (i.e., autonomously) without occupants to a particular place may transmit a suitable configuration change input over a wireless communication network to a communications component of the vehicle 100. In FIG. 4A, the vehicle 100 is shown in a driven configuration in which the vehicle has a roof height $H_1$. In response to receiving the configuration change input, the vehicle processor may determine an occupancy status of the vehicle to ensure the vehicle 100 is unoccupied before changing the vehicle to an unoccupied configuration. In response to determining that the vehicle is unoccupied, the vehicle processor may activate actuators or the like configured to reconfigure interior components and/or change an exterior shape of a body of the vehicle 100 to an unoccupied configuration. For example, actuators may pivot ($p_{SW}$) the steering wheel 180 to a lower position (or withdraw the steering wheel from the cabin) and similarly tilt ($a_{SB}$) the seat backs 182 to a lower position or otherwise reduce the cabin space occupied by the seats. Additionally, actuators may lower the height $H_1$ of the roof. FIG. 4B illustrates the vehicle 100 with the steering wheel 180 and the seat backs 182 pivoted down to a lower position. In addition, the roof is being lowered, as indicated by the arrow $h_R$ to a second roof height $H_2$. FIG. 4C illustrates the vehicle 100 in a no-occupant configuration associated with a third roof height $H_3$, which is the lowest roof height.

Figure 5A:
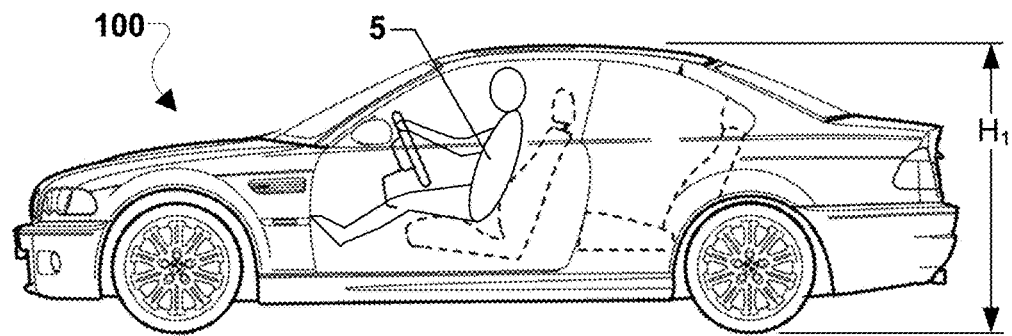
FIGS. 5A and 5B are schematic diagrams of a vehicle reconfiguring internal components and modifying an external shape thereof from a driven configuration to a first driverless configuration in accordance with various embodiments.
Figure 5B:
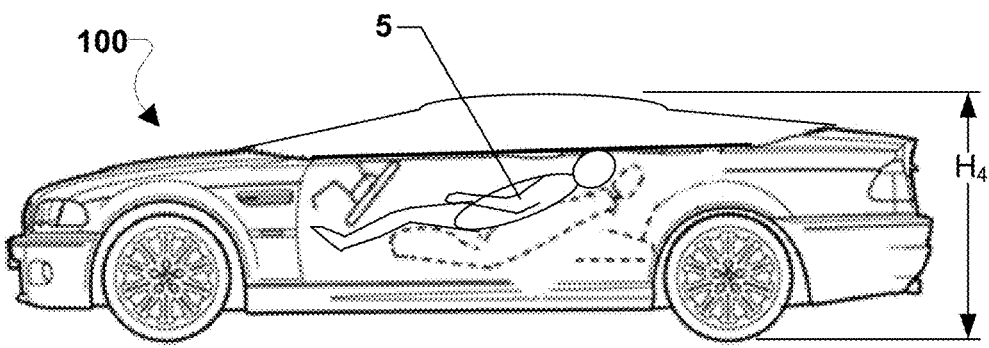

FIGS. 5A-5B illustrate a vehicle 100 configured with reconfigurable internal components and a modifiable exterior shape, in accordance with various embodiments. With reference to FIGS. 1A-5B, a processor (e.g., 164) of the vehicle 100 may receive a configuration change input in the form of a command directing the vehicle 100 to change to a first driverless configuration (i.e., occupants in the vehicle, but no occupant driving). More than one driverless configuration may be available, such as one for occupants to sleep and another for occupants to face one another. The first driverless configuration may provide a suitable cabin environment for occupants to sleep. For example, a vehicle operator on a long drive may want to sleep and thus direct the vehicle 100 to drive itself (i.e., autonomously) for a while. In FIG. 5A, the vehicle 100 is shown in a driven configuration with the roof height $H_1$, and an operator 5 driving.

In accordance with various embodiments, the operator 5 may transmit a suitable configuration change input, such as using an onboard user interface of the vehicle 100, directing the vehicle 100 into a first driverless configuration in which all seats are reclined for sleeping and the roof is lowered to reduce aerodynamic drag (and thus increase fuel efficiency or battery driving range). In response to receiving this configuration change input, the vehicle processor may determine an occupancy status of the vehicle. In response to determining that the occupancy status of the vehicle is occupied but with the seats upright, the vehicle processor may control actuators configured to lower the steering wheel and recline the seats, and thus change an exterior shape of a body of the vehicle 100 to the first driverless configuration. FIG. 5B shows the driver's seat back reclined with the former driver (and now passenger) in a supine position. Additionally in FIG. 5B, the vehicle actuators lowered the roof to a fourth height $H_4$ in the first driverless configuration.

Further, in response to receiving a configuration change input directing the vehicle into the first driverless configuration, the vehicle processor may activate additional actuators or systems for moving parts of the vehicle to accommodate passengers or other elements associated with the first driverless configuration. For example, air bags and other safety features (e.g., seat belt) may be repositioned to accommodate an occupant in a reclined or other reconfigured position, such as when a seat is reconfigured to face backward or sideways. In this way, the vehicle processor may ensure vehicle safety features are positioned appropriately to accommodate occupants while they sleep, rest, or are otherwise not driving. As another example, the vehicle processor may adjust a steering column (or other mechanism to control the vehicle), an infotainment system, and/or controls for controlling some other aspect of the vehicle (e.g., temperature, volume, windows etc.). In some embodiments, components (e.g., airbags) need not be reconfigured, but merely unlocked or readied for activation in association with the first driverless configuration. For example, in a particular driverless configuration, airbags located in a ceiling or other section of the vehicle that do not normally deploy upon impact may be unlocked or configured for deployment in the event of a vehicle impact. Thus, vehicles implementing such embodiments may be equipped with airbags that are configured to protect passengers or cargo and enabled in only some interior configurations (e.g., when front seats are facing rearward), while some airbags configured to protect passengers or cargo during normal driving configurations may be inhibited or disabled when the vehicle's is in an interior configuration in which deployment would provide no benefit or could injure passengers or cargo.

Figure 6A:
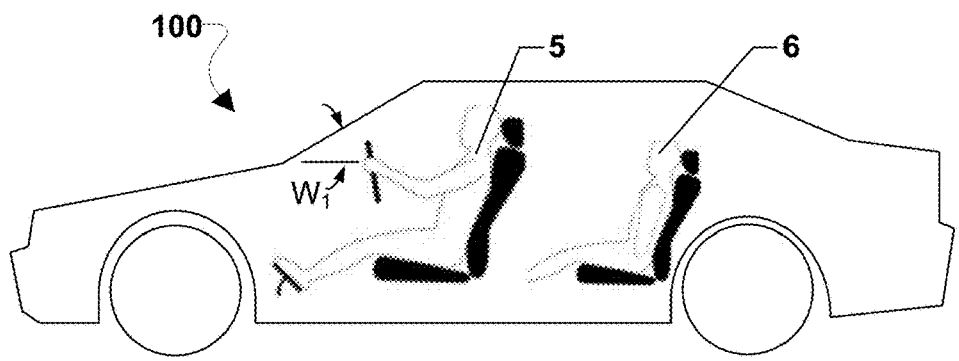
FIGS. 6A and 6B are schematic diagrams of a vehicle reconfiguring internal components and modifying an external shape thereof from a driven configuration to a second driverless configuration in accordance with various embodiments.
Figure 6B:
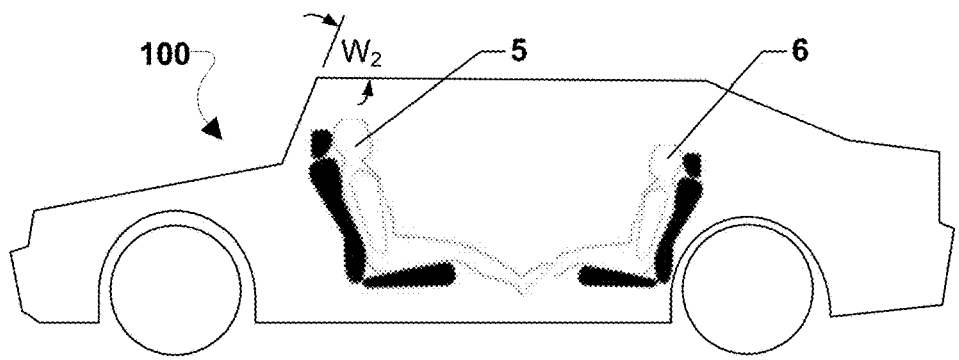

FIGS. 6A-6B illustrate a vehicle 100 configured with reconfigurable internal components and a modifiable exterior shape in accordance with various embodiments. With reference to FIGS. 1A-6B, a processor (e.g., 164) of the vehicle 100 may receive a configuration change input in the form of a command directing the vehicle 100 to change to a second driverless configuration (i.e., occupants in the vehicle, but no occupant driving). The second driverless configuration may provide a suitable cabin environment for occupants (e.g., an operator 5 or passenger(s) 6) to face one another. For example, the vehicle operator 5 on a long drive may no longer wish to drive and thus direct the vehicle 100 to drive itself (i.e., autonomously) for a while.

In FIG. 6A, the vehicle 100 is shown in a driven configuration with the windshield inclined at a conventional driving angle $W_1$, with an operator 5 driving and a passenger 6 in the rear. In accordance with various embodiments, the operator 5 may transmit a suitable configuration change input, such as using an onboard user interface of the vehicle 100, directing the vehicle 100 into a second driverless configuration. In response to receiving the configuration change input directing the vehicle 100 into the second driverless configuration, the vehicle processor may determine an occupancy status of the vehicle, which in this scenario determines that the vehicle is occupied but with the seats all facing forward. Thus, the vehicle processor may activate actuators configured to change the front seats, or at least the driver's seat, to rotate to face the rear passenger seats and to change an exterior shape of a body of the vehicle 100 to the second driverless configuration.

FIG. 6B shows that actuators have pivoted the windshield to a second angle $W_2$ that is greater than the first angle $W_1$. In addition, actuators extended the roof, increasing the interior cabin space, and thus allowing the driver's seat to swivel and face the rear seats. Further, in response to receiving the configuration change input directing the vehicle into the second driverless configuration, the vehicle processor may darken or black-out the windows. Darkening the windows may increase privacy to occupants, to cargo, or to make it unknown whether anything/anyone is inside. In addition, blacking out the windows may allow, for example, in-cabin lighting to further illuminate the cabin without causing a distraction to drivers of other vehicles.

Figure 7:
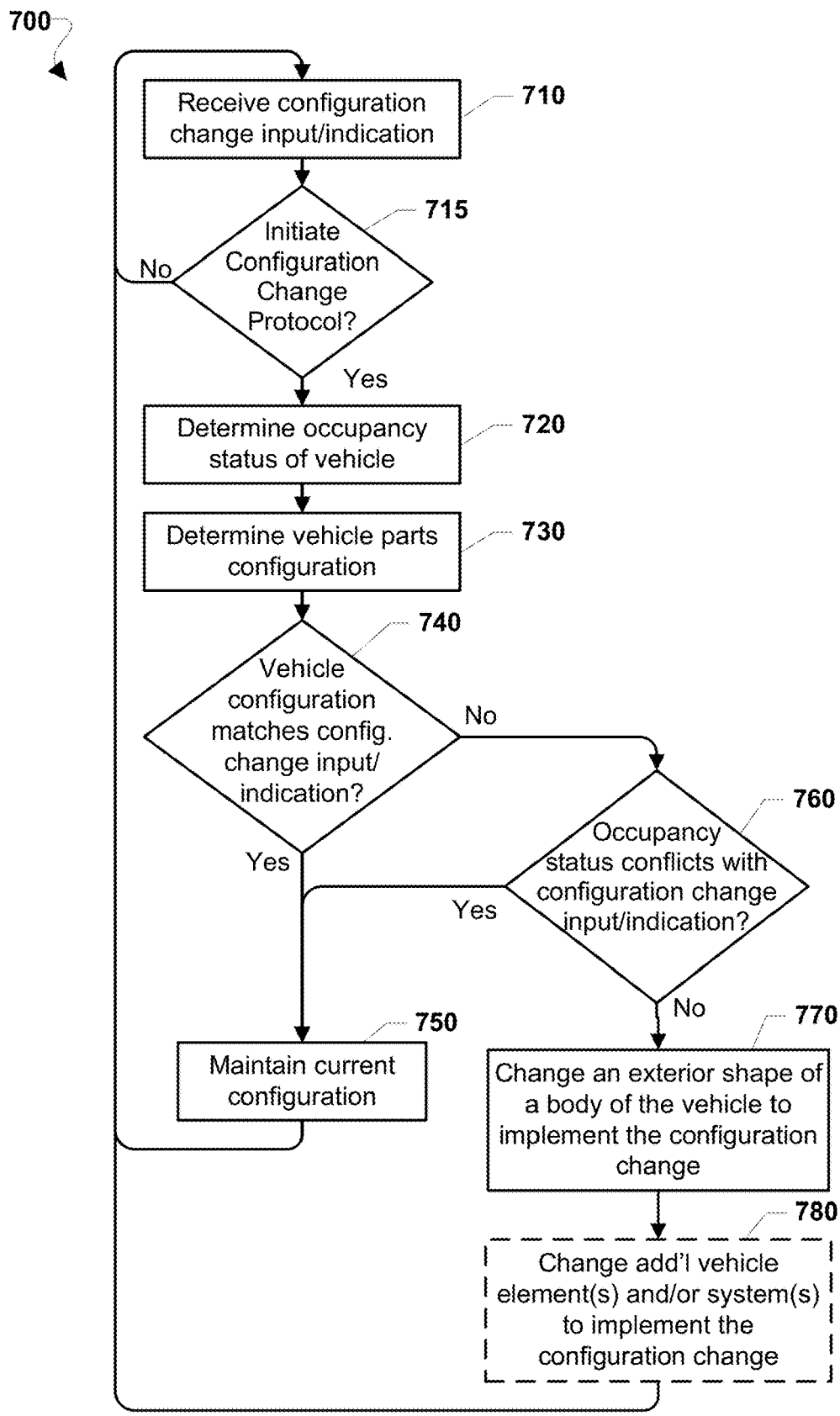
FIG. 7 is a process flow diagram of an example method of modifying a vehicle exterior shape based on occupancy of the vehicle according to various embodiments.

FIG. 7 is a process flow diagram illustrating a method 700 of modifying a vehicle exterior shape based on occupancy of the vehicle, which may be implemented in accordance with various embodiments. With reference to FIGS. 1A-7, the method 700 may be performed by a processor of a vehicle, such as the processor (e.g., 164) of the control unit (e.g., 140) in the vehicle (e.g., 100), a SoC (e.g., 300), or another computing device. For ease of reference, the device executing operations of the method 700 are referred to herein generally as a "processor."

In block 710, a processor of the vehicle may receive a configuration change input or indication. For example, vehicle configuration management layer (e.g., 240) within a vehicle control system stack (e.g., 200) may receive inputs from an onboard user interface (e.g., user interface 152), or receive a configuration change indication from vehicle communications components (e.g., radio module 172), or the sensor perception layer (e.g., 210) and/or the camera perception layer (e.g., 220) via the vehicle occupancy and configuration perception layer (e.g., 230). A configuration change input or indication may include an indicator that a future operating mode, event or environment is planned or predicted. For example, the configuration change input or indication may include information that the vehicle will be operating (i.e., a future operating environment) with/without a driver, with/without occupants, with/without a payload (i.e., objects and/or animals) stopping on a road, parking, (i.e., a future operating event), operating on/off a road, operating in a platoon, or in a vehicle elevator parking structure or other confined space. In this way, the control unit may receive the configuration change input or indication and determine whether the configuration change input/indication includes information regarding a planned or predicted future operating mode, event or environment.

In determination block 715, the processor may determine whether to initiate a configuration change protocol to perform a configuration change. The configuration change protocol may be a procedure configured to modify the exterior shape of a body of the vehicle and/or modify an arrangement of an internal structure of the vehicle. The determination of whether to initiate the configuration change protocol may be based on whether the configuration change input or indication includes information regarding at least one planned or predicted future operating mode, event or environment. The vehicle control unit may include a list or database (e.g., stored in memory 166) of planned and/or predicted future operating modes, events and/or environments, each associated with a particular vehicle external shape configuration and/or an arrangement of internal structures of the vehicle. Using such a data table, the processor may check whether information provided by the configuration change input or indication matches one or more of the planned and/or predicted future operating modes, events and/or environments included in the list.

For example, operating modes, events or environments that may be listed in such a data table may include that a vehicle will be driven on a road, off-road, and/or in cramped conditions (e.g., inside a building, parking structure, or in a platoon configuration). Also, operating modes, events and/or environments that may be listed in such a data table may include that a vehicle will be stopped, on a road, on a side of the road, off-road, and/or inside a building or other structure. The operating modes, events and/or environments may be specific, such as the vehicle will be operating on a multi-lane highway and not just any road; or the vehicle will be on/in a parking elevator and not just any structure. Operating modes may also take into account or be based primarily on an occupancy status (e.g., a driverless mode, passenger-less mode driverless mode, driven mode, and variations thereof).

In addition, or optionally, the processor may take into consideration how long a configuration change takes to implement and how long before the planned or predicted future operating mode, event or environment occurs or is encountered when determining whether to initiate a configuration change protocol. Thus, if there is not enough time to implement a configuration change in the future, the processor may determine not to initiate the configuration change protocol at the current time.

The processor may take into account a current operating environment of the vehicle when determining whether to initiate a configuration change protocol. If the vehicle is currently moving on a road, some modifications to the exterior shape of a body of the vehicle may not be appropriate. For example, if a proposed modification to the exterior shape involves expanding or elongating a width or length of the vehicle, such modifications may startle drivers of other nearby vehicles and thus be considered dangerous and inappropriate. In contrast, non-intrusive or non-startling modifications, like modifications to an arrangement of internal structures or some external structures (e.g., lowering a height of the vehicle's roof), may be appropriate at any time. Some modifications may be appropriate under certain conditions, but not under others.

In response to determining that the configuration change protocol should not be initiated (i.e., determination block 715="No"), the processor may await receipt of another configuration change input or indication in block 710.

In response to determining that the configuration change protocol should be initiated (i.e., determination block 715="Yes"), the processor may initiate the configuration change protocol and determine an occupancy status of the vehicle in block 720 before activating actuators to modify the vehicle.

In block 720, the processor may determine an occupancy status of the vehicle. For example, the control unit may use information compiled in the vehicle occupancy and configuration perception layer (e.g., from seat sensors and/or internal cameras) and received/accessed from the sensor perception layer and/or the camera perception layer for determining the occupancy status of the vehicle. The occupancy status determined in block 720 may include not only whether there is an occupant in the vehicle, but the number of occupants, where the occupants are sitting (e.g., front or rear seats, left or right side, etc.), whether an occupant is in the driver seat, and the like. In some embodiments, the occupancy status determined in block 720 may include the identity of one or more occupants, which may be linked to stored preferences of identified occupants (e.g., whether the occupant is a licensed driver, seat configuration preferences of the occupant, interior and exterior shape preferences or dislikes, etc.), which the processor may take into consideration (e.g., in determination block 760 or determination block 902 of the method 900 described with reference to FIG. 9 or block 1010 and determination blocks 1020, 1030 of the method 1000 described with reference to FIG. 10).

In block 730, the processor may determine a current vehicle parts configuration, which may identify a configuration of outer physical parts that form the exterior shape of the body of the vehicle. For example, the processor may use information compiled in the vehicle occupancy and configuration perception layer and received/accessed from the sensor perception layer, the camera perception layer, and the stored vehicle configuration data for determining the current parts configuration of the vehicle. In some embodiments, the current parts configuration of the vehicle may be stored as a data structure (e.g., a configuration or status vector) in memory that is update with each configuration change. In such implementations, the processor may determine the current vehicle parts configuration in block 730 by accessing the current configuration or status vector in the memory. In some embodiments, the processor may determine the current vehicle parts configuration in block 730 by obtaining orientation or status information from various components that change position, orientation or shape when the vehicle configuration is changed.

In determination block 740, the processor may determine whether the current vehicle parts configuration (i.e., the arrangement of parts) matches the configuration called for in the received configuration change input or indication. A match of the current vehicle parts configuration to the configuration called for in the configuration change input or indication may be an exact match (i.e., they are the same) or a compatibility match (i.e., they do not conflict with one another). A compatibility match may have all the required vehicle configuration elements needed for a match, but also include other optional configuration elements not specified by the configuration change input or indication.

In response to determining that the current vehicle parts configuration matches the received configuration change input or indication (i.e., determination block 740="Yes"), the processor need not activate any actuators and may maintain the current vehicle parts configuration in block 750.

In response to determining that the current vehicle parts configuration does not match the received configuration change input or indication (i.e., determination block 740="No"), the processor may determine whether the current occupancy status of the vehicle conflicts (i.e., is incompatible or unsafe) with the occupancy status allowed for the configuration called for in the received configuration change input or indication in determination block 760. This determination operation provides a safety feature in which the process determines whether a configuration change might injure an occupant before initiating such a change. In particular, if the configuration called for in the received configuration change input or indication is passenger-less, the processor may determine whether the vehicle is occupied by any passengers, as the presence of one or more passengers in the vehicle is (or could be) incompatible with the passenger-less configuration. However, this operation may not be performed if the configuration called for in the received configuration change input is to the driven configuration or passenger configuration as making that configuration change can be accomplished safely when there are no occupants in the vehicle. Further, there may be no room for occupants in the initial configuration, and thus determination block 760 may only be performed when the current vehicle configuration is a driven configuration or a passenger configuration. Additionally, this determination may not be performed if the processor determines that the vehicle is not occupied in block 720.

In response to the processor determining that the current occupancy status of the vehicle conflicts (i.e., is incompatible or unsafe) with the occupancy status allowed for the configuration called for in the received configuration change input or indication (i.e., determination block 760="Yes"), the processor will not activate any actuators and maintain the current vehicle parts configuration in block 750. Additionally, the processor may inform the operator or occupants of the vehicle, such as by an annunciation, display or alarm, that the requested configuration change is blocked due to the presence of occupants in the vehicle.

In response to determining that the current occupancy status of the vehicle does not conflict (i.e., is compatible or safe) with the occupancy status called for in the received configuration change input or indication (i.e., determination block 760="No"), the processor may change an exterior shape of a body of the vehicle to implement the configuration change in block 770. In block 770, the processor may activate actuators to change the vehicle's external shape or dimensions (e.g., compresses/expand the roof or change an inclination angle of the windshield or other windows). Additionally or alternatively, the processor may activate smart materials configured to change the shape of one or more exterior portions of the body of the vehicle consistent with the configuration change input in block 770.

In optional block 780, the processor may change or adjust one or more additional vehicle elements and/or systems consistent with implementing the configuration change. For example, the processor may change a position of the steering wheel (e.g., retract/deploy or pivot). Retracting, deploying, or pivoting the steering wheel may provide more leg room for a passenger sitting in the driver's seat but who is not driving (i.e., driverless mode). Similarly, modifying a configuration of the steering wheel may allow the roof to be lowered to a fuller extent. Additionally or alternatively, the processor may change a position of one or more seats. Folding down seats may increase storage space or space for passengers. In this way, seats may be moved forward to provide more leg room in the back seats, or seats may be rotated or rearranged. Additionally or alternatively, the outside mirrors may be folded back to accommodate a driverless or no-occupant configuration. Similarly, for a no-occupant configuration, the vehicle suspension may be adjusted since rider comfort may not be a concern. As another example, the processor may enter or activate a driverless mode or passenger-less mode of operation. Such driverless or passenger-less modes may use various operational parameters for autonomous navigation and vehicle control may be adjusted when the configuration change places the vehicle in the passenger-less mode of operation. For example, vehicle maximum and/or minimum speed limits may be increased or decreased, maximum turning rates may be increased, maximum braking rates may be increased, and minimum vehicle-to-vehicle distances may be reduced when the vehicle enters the passenger-less mode since occupant comfort is not a consideration. Similarly, vehicle maximum and/or minimum speed limits may be increased or decreased, maximum turning rates may be increased, maximum braking rates may be decreased, and minimum vehicle-to-vehicle distances may be increased when the vehicle enters the passenger mode so as to provide a more comfortable ride for occupants.

In some implementations, entering a driverless or passenger-less mode may result in changes to navigation functions in optional block 780 as such vehicles may be permitted on certain roadways or permitted to operate differently than human operated vehicles. For example, entering a driverless or passenger-less mode may result in the navigation system selecting a different navigation route (e.g., longer, slower, more efficient, bumpier, etc.); obtaining access to special roads/lanes (e.g., high-occupancy vehicle (HOV) lanes); obtaining access (e.g., automatically) through customs (e.g., US-Mexico border); setting a charging/fueling schedule/plan (e.g., since a no-occupant vehicle does not have to worry about drivers/passengers getting bored, a car can spend extra time waiting to charge/refuel, perhaps at a cheaper rate); or causing the vehicle to wait before driving to a destination in order to avoid rush-hour or congestion.

As another example, the processor may implement various power saving measures for the vehicle when in the passenger-less mode in optional block 780. For example, the processor may turn off or adjust an onboard heating, ventilation and air conditioning (HVAC) system (e.g., turn off if no occupants or turn on the keep temperatures down or up to food fresh or warm, such as for food delivery). Similarly, seat warmers/coolers may be disabled to save power or enabled to keep food or other payloads warm. Systems provided for occupant comfort or entertainment, such as vehicle infotainment systems, Wi-Fi hotspot, onboard power ports, instrument cluster displays, interior lighting, airbags (particularly where no occupants are seated), rear-view cameras (back-up cams) may be disabled, dimmed, or turned off. Window defrosters may be disabled for driverless or passenger-less modes, since frost/condensation on windows does not impact vehicle sensors used in autonomous driving operations. Occupant notifications (e.g., engine lights, incoming phone calls, low tire pressure, etc.) may also be disabled in the driverless and passenger-less modes. Windows may be blacked-out in the driverless and passenger-less modes, such as to allow passengers to use onboard lighting within vehicle without causing a distraction to other vehicles and/or to provide vehicle occupants with privacy. Certain vehicle inputs may be disabled in the driverless and passenger-less modes, such as the steering wheel, brake and accelerator pedals, touch display, etc. Additionally, windshield wipers may be disabled or adjusted as not needed by the autonomous systems. Similarly, different headlight settings may be used in the driverless and passenger-less modes, such as lower lighting just enough to allow other vehicle to see the subject vehicle, but less than normal since autonomous systems may not need the road lighting.

In some embodiments, the processor may be equipped with an indicator or indicators that may be activated in the driverless or passenger-less modes to notify other vehicles, people (e.g., pedestrians), or others that the vehicle is in such an operating mode. Such an indicator or indicators may be a visual indicator that visually informs other drivers/pedestrians that an autonomous vehicle is in manual or autonomous mode. In some embodiments, such an indicator or indicators may be a digital indicator to other vehicles, police, emergency personnel, or traffic control systems.

In block 770 and in optional block 780, implementing the configuration change may be performed in multiple ways in various embodiments. For example, implementing the configuration change may be scheduled for a particular time (e.g., a time of day), scheduled to terminate after a predetermined period, or scheduled to take place upon arriving at a predetermined destination (e.g., at a package delivery or passenger pick up destination). Implementing the configuration change may take place while the vehicle is moving (e.g., operating by self-powered motion). For example, a configuration change from passenger-less mode to passenger mode may be implemented while the vehicle is en route to pick-up a passenger or driver. Implementing the configuration change may be triggered by sensor readings, such as a sensor detecting the presence of a person touching a door handle, a sensor detecting the presence of a particular person (e.g., based on facial recognition or other biometrics), or a sensor detecting the presence of a wireless key fob or other trigger close to the vehicle. Similarly, the implementation may be activated from a computing device application, location-based.

The operations in the method 700 may be performed continuously, periodically, or episodically, such as in response to receiving another configuration change input in block 710.

Figure 8:
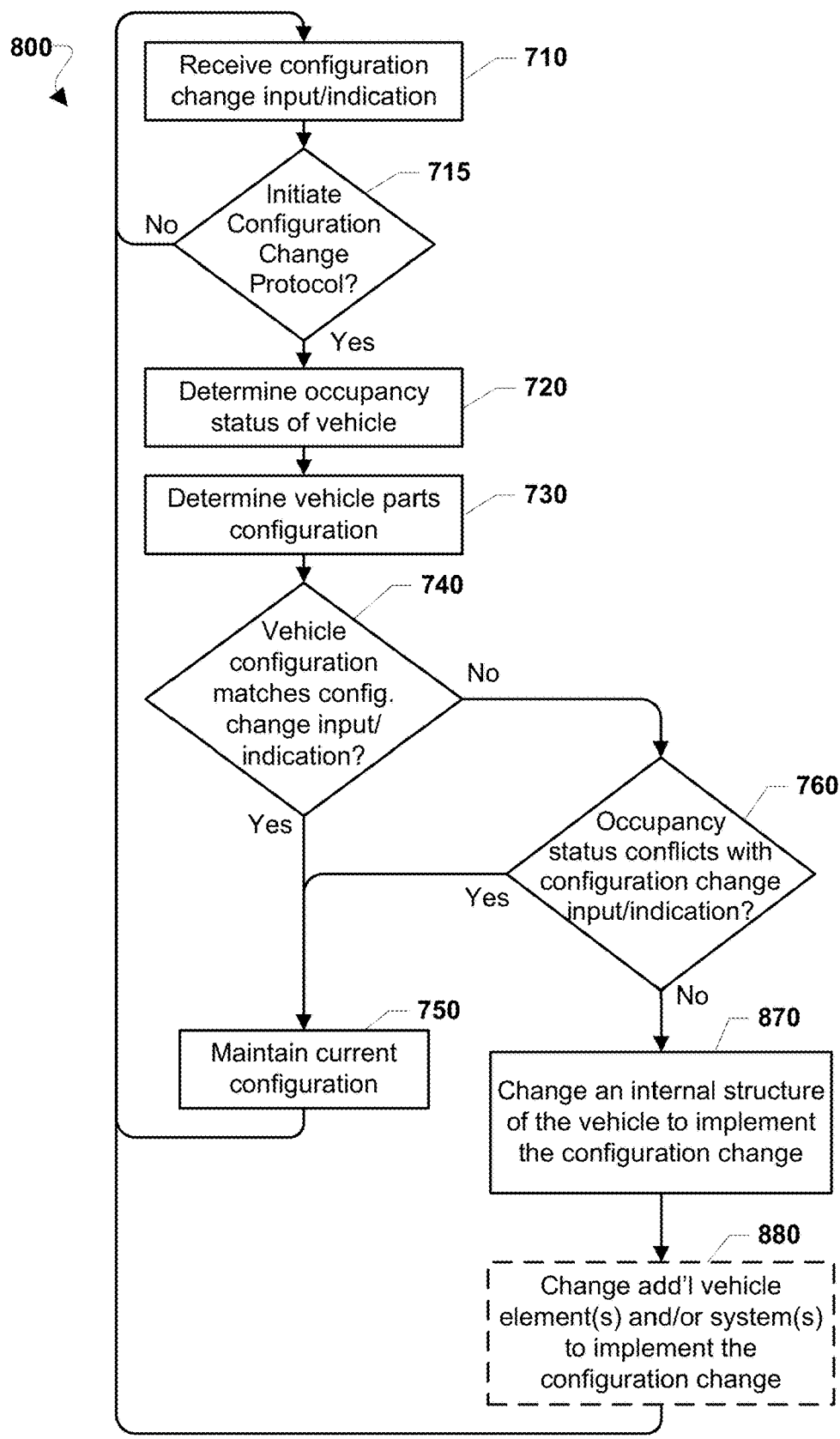
FIG. 8 is a process flow diagram of an example method of modifying a vehicle interior component configuration based on occupancy of the vehicle according to various embodiments.

FIG. 8 is a process flow diagram illustrating a method 800 of modifying a vehicle interior component configuration based on occupancy of the vehicle, which may be implemented in accordance with various embodiments. With reference to FIGS. 1A-8, the method 800 may be performed by a processor of a vehicle, such as the processor (e.g., 164) of the control unit (e.g., 140) in the vehicle (e.g., 100), a SoC (e.g., 300), or another computing device. For ease of reference, the device executing operations of the method 700 are referred to herein generally as a processor.

In the method 800, the processor may modify a vehicle configuration by performing operations of blocks 710, 720, 730, and 750 and determination blocks 715, 740, and 760 of the method 700 as described.

In response to determining that the current occupancy status of the vehicle does not conflict (i.e., is compatible or safe) with the occupancy status allowed for the configuration called for in the received configuration change input (i.e., determination block 760="No"), the processor may change an internal structure of the vehicle to reconfigure the vehicle to implement the configuration change in block 870. In block 870, the processor may activate actuators to change a position of the steering wheel (e.g., retract/deploy or pivot). Retracting, deploying, or pivoting the steering wheel may provide more leg room for a passenger sitting in the driver's seat but who is not driving (i.e., driverless mode). Additionally or alternatively, the processor may change a position of one or more seats, such as moving front seats forward or backward, rotating front seats to face sideways or rearward, folding down seats, or any combination of such movements. Moving, rotating and/or folding seats may increase storage space or leg room and volume for passengers.

In optional block 880, the processor may change or adjust one or more additional vehicle elements and/or systems consistent with implementing the configuration change. For example, the processor may control actuators to change the vehicle's external shape or dimensions (e.g., compresses/expand the roof or change an inclination angle of the windshield or other windows). Modifying a configuration of internal elements (e.g., the steering wheel, seats, rearview mirror, etc.) may allow exterior dimensions of the vehicle to be changed or changed to a further extent, such as enabling the roof to be lowered to a fuller extent. As another example, the processor may activate smart materials configured to change shape consistent with the configuration change input. As another example, the outside mirrors may be folded back to accommodate a driverless or no-occupant configuration. As another example, for a no-occupant configuration, the vehicle suspension may be adjusted since rider comfort may not be a concern. As another example, the processor may enter or activate a driverless mode, passenger-less mode, or power saving measures as described for optional block 780 of the method 700.

The processor may implement the configuration changes in block 870 and in optional block 880 in anticipation of a need or potential need for the new configuration based on a variety of inputs or indications in various embodiments. In some embodiments, the processor may be configured, programmed or otherwise controlled to implement the configuration change at a particular time (e.g., a time of day based on an indication from a schedule or navigation system), to terminate the configuration change after a predetermined period or at a predetermined time, and/or upon arriving at a predetermined destination (e.g., at a package delivery or passenger pick up destination based on an indication from a navigation system). In some embodiments, the processor may implement the configuration change while the vehicle is moving (e.g., operating by self-powered motion). For example, a configuration change from passenger-less mode to passenger mode may be implemented while the vehicle is en route to pick-up a passenger or driver based on such as in response to an indication from a scheduling system (e.g., scheduling a passenger or driver pickup) and a navigation system (e.g., providing an estimate of the arrival time or travel time remaining). In some embodiments, the processor may implement the configuration change in response to one or more sensor readings or user inputs, such as an input provided by a person touching a door handle, an indication from a sensor detecting the presence of a particular person (e.g., based on facial recognition or other biometrics), or a sensor detecting the presence of a wireless key fob or other trigger close to the vehicle. In some embodiments, the processor may implement the configuration change in response to a message from a computing device application. In some embodiments, the processor may implement the configuration change in response to the vehicle approaching or arriving at a particular location (i.e., location-based activation), such as in response to an indication from a scheduling system (e.g., scheduling a passenger or package pickup) and a navigation system (e.g., providing an estimate of the arrival time or travel time remaining).

The operations of the method 800 may be performed continuously, periodically, or episodically, such as in response to receiving another configuration change input in block 710 of the method 800.

Figure 9:
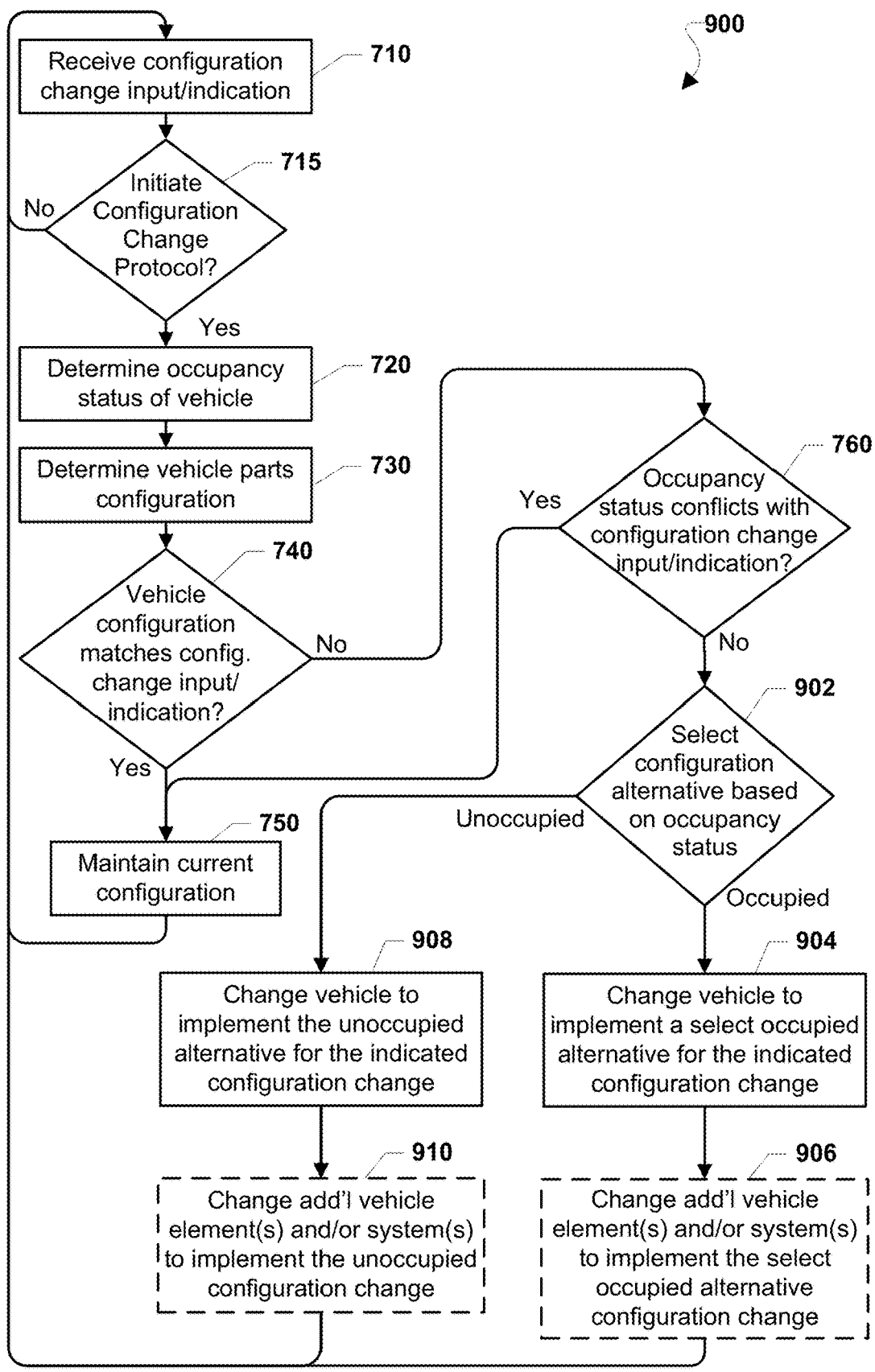
FIG. 9 is a process flow diagram of an example method of modifying a vehicle structural configuration to an occupied or unoccupied version of a selected configuration based on occupancy of the vehicle according to various embodiments.

FIG. 9 is a process flow diagram illustrating a method 900 of modifying a vehicle structural configuration to an occupied or unoccupied version of a selected configuration based on occupancy of the vehicle according to some embodiments. With reference to FIGS. 1A-9, the method 900 may be performed by a processor of a vehicle, such as the processor (e.g., 164) of the control unit (e.g., 140) in the vehicle (e.g., 100), a SoC (e.g., 300), or another computing device. For ease of reference, the device executing operations of the method 700 are referred to herein generally as a "processor."

In the method 900, the processor may modify a vehicle configuration by performing operations of blocks 710, 720, 730, and 750 and determination blocks 715, 740, and 760 of the method 700 as described.

In response to determining that the current occupancy status of the vehicle does not conflict (i.e., is compatible or safe) with the occupancy status called for in the received configuration change input or indication (i.e., determination block 760="No"), the processor may select from one or more configuration alternatives (i.e., a suitable match or alternative to the configuration indicated in the configuration change input or indication received in block 710) based on the current occupancy status of the vehicle in determination block 902. This selection or determination operation addresses configurations that have occupied and unoccupied alternatives. For example, a platooning operation mode may not conflict with the occupancy status because the mode can be implemented with and without passengers, and thus may involve or support multiple alternative structural configurations for the vehicle, such as one configuration in which a driver is present without passengers, one or more other configurations in which a driver is present with one or more passengers that may vary based on where the passenger(s) is/are seated, one or more configurations in which no driver is present but one or more passengers is/are present in the vehicle with the configuration depending on where the passenger(s) is/are seated, and a different configuration when no passengers are present. For example, an exterior shape of the vehicle may be changed differently when the only passenger is in the front passenger seat, as opposed to when the only passenger is in the rear left passenger seat. Similarly, there may be different vehicle changes associated with each combination of seating, from one occupant to max occupancy. As a further example, a passenger-less platooning configuration may include changes to the windscreen and roof orientations/positions that enable a more aerodynamic configuration while positioned within a platoon that an occupied platooning configuration that leaves more room for passengers within the vehicle body. As another example, an occupied platooning configuration in which passengers are seated only in rear seats may involve modifying a shape of the forward portion of the vehicle exterior that reduces air resistance in a platooning formation (e.g., leading a platoon) while leaving room for the passengers. Similarly, an occupied platooning configuration in which passengers are seated only in front seats may involve modifying a shape of the rear portion of the vehicle exterior that reduces air resistance in a platooning formation (e.g., at the rear of a platoon) while leaving room for the passengers. Platooning is merely one example of providing for alternative configurations depending upon the occupancy state of the vehicle, and other operating modes or configurations may also involve occupied and unoccupied alternatives (e.g., a park configuration).

In response to determining that the vehicle is occupied and selecting one of the occupied alternative configurations (i.e., determination block 902="Occupied"), in block 904, the processor may control actuators or other controlled elements (e.g., materials controlled by electricity or other agent to change color/tinting, such as windows, and/or shape) to change an exterior (e.g., exterior shape or other characteristic) and/or interior configuration to implement the selected occupied alternative to the indicated configuration change. For example, selected occupied alternative configuration change may depend on where any occupants (driver or passenger(s)) are seated. Thus, in block 904, the processor may control actuators to change an exterior and/or interior of the vehicle or otherwise operate the vehicle in a manner that provides room for occupants, including a driver and/or passengers, taking into account where within the vehicle the occupant(s) is/are located, provides privacy for the occupant(s), provides a safe environment for the occupant(s), etc.

In optional block 906, the processor may change or adjust one or more additional vehicle elements and/or systems to implement the selected occupied alternative for the indicated configuration change.

In response to determining that the vehicle is unoccupied and selecting the unoccupied alternative configuration (i.e., determination block 902="Unoccupied"), the processor may control actuators to change an exterior and/or interior of the vehicle consistent with the unoccupied alternative configuration change in block 908. For example, in block 908, the processor may control actuators to change an exterior and/or interior shape of the vehicle or otherwise operates the vehicle in a manner that increases efficiency not possible when passengers are present, operates the vehicle without restrictions required for passenger health or safety, etc.

In optional block 910, the processor may change or adjust one or more additional vehicle elements and/or systems consistent with implementing the unoccupied configuration change.

The operations of the method 900 may be performed continuously, periodically, or episodically, such as in response to receiving another configuration change input in block 710 of the method 900.

Figure 10:
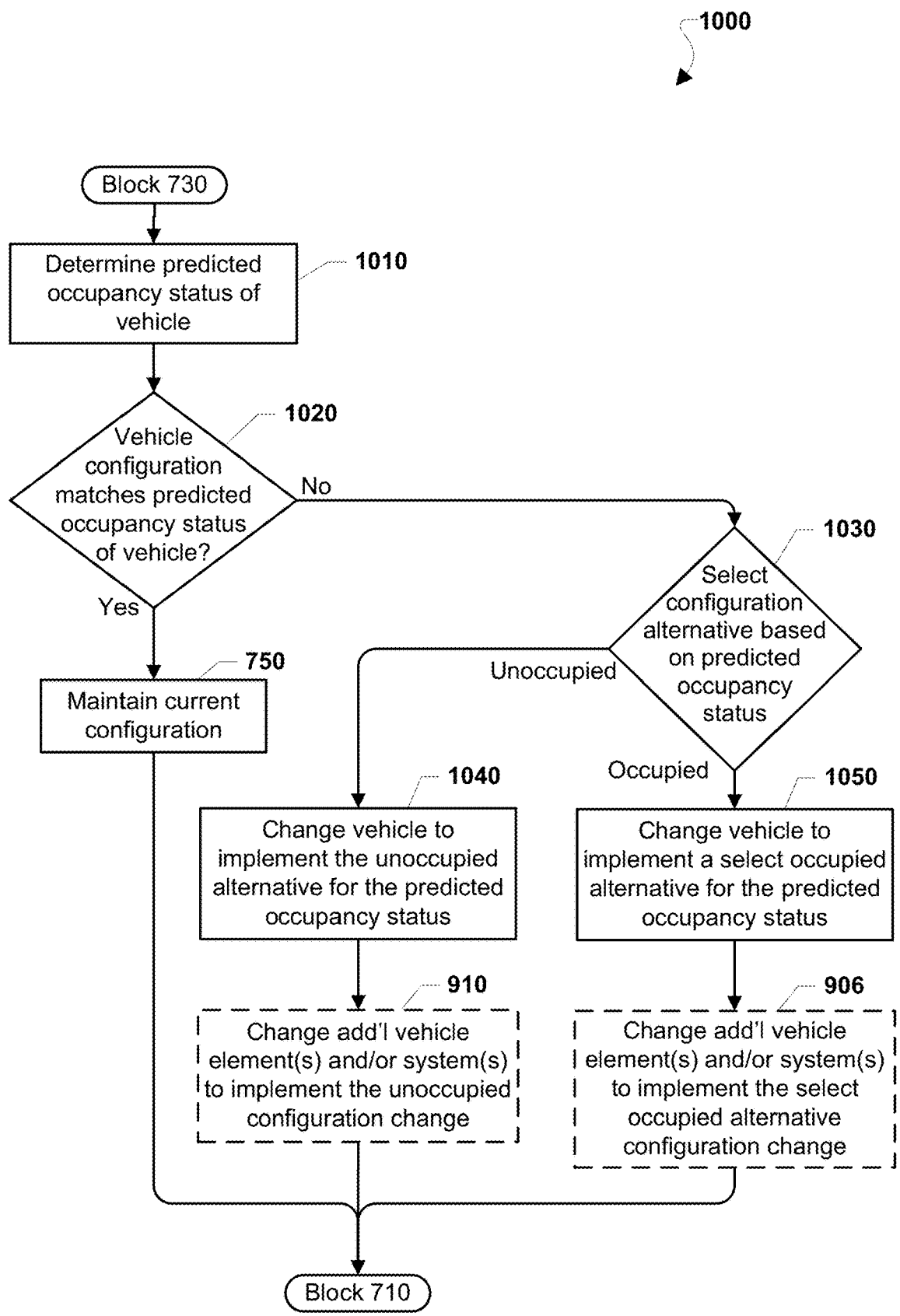
FIG. 10 is a process flow diagram of an example method of modifying a vehicle structural configuration to an occupied or unoccupied version of a selected configuration based on a predicted occupancy of the vehicle according to various embodiments.

FIG. 10 is a process flow diagram illustrating a method 1000 of modifying a vehicle structural configuration to an occupied or unoccupied version of a selected configuration based on a predicted occupancy of the vehicle according to some embodiments. With reference to FIGS. 1A-10, the method 1000 may be performed by a processor of a vehicle, such as the processor (e.g., 164) of the control unit (e.g., 140) in the vehicle (e.g., 100), an SoC (e.g., 300), or another computing device. For ease of reference, the device executing operations of the method 700 are referred to herein generally as a "processor."

In the method 1000, the processor may modify a vehicle configuration by performing operations of blocks 710, 720, 730, and 750 and determination block 715 of the method 700 as described, as well as blocks 906 and 910 of the method 900 as described.

In block 1010, following the operations of block 730, the processor may determine a predicted occupancy status. For example, the control unit may use information received/accessed from the sensor perception layer and/or the camera perception layer for determining the predicted occupancy status of the vehicle. The predicted occupancy status determined in block 1010 may include not only whether an occupant is expected to be in the vehicle, but the number of predicted occupants, where the predicted occupants will likely sit (e.g., front or rear seats, left or right side, etc.), whether a predicted occupant is likely to sit in the driver seat, and the like. The prediction regarding occupants may include whether a driver, passenger(s), or other items (e.g., cargo) will enter or exit the vehicle. In some embodiments, the predicted occupancy status determined in block 1010 may draw from a stored profile for one or more predicted occupants, identified through mobile phone proximity (e.g., when a Bluetooth or other wireless communication link is established) or other sensor inputs. Such stored profiles may not only identify predicted occupants, but may also predict a preferred seating configuration, interior and exterior shape preferences or dislikes, etc., which the processor may also take into consideration for other determinations (e.g., in determination block 1030 and/or determination block 760 or determination block 902 of the method 900 described with reference to FIG. 9).

In determination block 1020, the processor may determine whether a current vehicle parts configuration (i.e., the arrangement of parts) matches the predicted occupancy status. A match of the current vehicle parts configuration to the configuration called for by the predicted occupancy status may be an exact match (i.e., they are the same) or a compatibility match (i.e., they do not conflict with one another). A compatibility match may have all the required vehicle configuration elements needed for a match, but also include other optional configuration elements not specified by the configuration change input or indication.

In response to determining that the current vehicle parts configuration matches the predicted occupancy status (i.e., determination block 1020="Yes"), the processor may maintain the current configuration in block 750 and then await receipt of another configuration change input or indication in block 710. In response to determining that the current vehicle parts configuration does not match the predicted occupancy status (i.e., determination block 1020="No"), the processor may select a configuration alternative based on the predicted occupancy status in determination block 1030.

In determination block 1030, the selection of the configuration alternative based on the predicted occupancy status may be based on configurations that have occupied and unoccupied alternatives, similar to configurations and circumstances described with regard to determination block 760 in FIG. 7 herein.

In response to selecting a configuration alternative based on a predicted occupancy status associated with the vehicle being occupied (i.e., determination block 1030="Occupied"), the processor may change the vehicle to implement the selected occupied alternative for the predicted occupancy status in block 1050 and then either change or adjust one or more additional vehicle elements and/or systems to implement the selected occupied alternative for the indicated configuration change in optional block 906 or more directly await receipt of another configuration change input or indication in block 710. In response to selecting a configuration alternative based on a predicted occupancy status associated with the vehicle being unoccupied (i.e., determination block 1030="Unoccupied"), the processor may change the vehicle to implement the selected unoccupied alternative for the predicted occupancy status in block 1040 and then either change or adjust one or more additional vehicle elements and/or systems to implement the selected unoccupied alternative for the indicated configuration change in optional block 910 or more directly await receipt of another configuration change input or indication in block 710.

In some embodiments, the configuration change input may be a selection of one configuration or operating mode among a number of different configurations and operating modes beyond those described. The various vehicle internal and external configurations to which the vehicle may change may provide a number of benefits, such as saving power (e.g., turning power consumption down or off for various components), reducing aerodynamic drag (e.g., lower the vehicle profile, such as by lowering the roof), enhancing passenger comfort, increasing payload volume, protecting vehicle components (e.g., disabling airbags avoids having to repair/replace them in the event of an accident), etc.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers.

Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of modifying an arrangement of an internal structure of a vehicle based on occupancy, comprising:
   determining, by a vehicle processor, whether to initiate a configuration change protocol to implement a configuration change for modifying the arrangement of the vehicle internal structure in response to a planned or predicted future operating mode, event or environment;
   determining, by the vehicle processor, whether an occupancy status of the vehicle conflicts with an occupancy status allowed for in a configuration called for by a configuration change input or indication; and
   modifying, by the vehicle processor, an arrangement of the vehicle internal structure in accordance with the configuration change input or indication in response to determining that the occupancy status of the vehicle does not conflict with the occupancy status allowed for in the configuration called for by the configuration change.

2. The method of claim 1, further comprising:
   determining, by the vehicle processor, whether a current vehicle configuration matches a configuration called for by the configuration change input or indication, wherein modifying the arrangement of the vehicle internal structure in accordance with the configuration change input or indication is further in response to determining that the current vehicle configuration does not match the configuration called for by the configuration change input or indication.

3. The method of claim 1, wherein modifying the arrangement of the vehicle internal structure in accordance with the configuration change input or indication comprises changing to a driverless configuration in response to determining that the occupancy status of the vehicle indicates that no occupant of the vehicle is or will drive the vehicle.

4. The method of claim 3, wherein changing to the driverless configuration comprises changing a facing direction of at least one seat in the vehicle.

5. The method of claim 1, wherein modifying the arrangement of the vehicle internal structure in accordance with the configuration change input or indication comprises changing to a driven configuration in response to determining that an occupant is driving or will drive the vehicle.

6. The method of claim 5, wherein changing to the driven configuration comprises changing at least one of an orientation of a steering wheel or a direction a seat in the vehicle faces.

7. The method of claim 1, further comprising:
   selecting one of a plurality of configuration alternatives based on the occupancy status in response to determining that the occupancy status of the vehicle does not conflict with the occupancy status allowed for in the configuration called for by the configuration change input or indication.

8. The method of claim 1, further comprising:
   selecting one of a plurality of configuration alternatives based on a predicted occupancy status of the vehicle determined in response to determining that the predicted occupancy status of the vehicle will not conflict with the occupancy status allowed for in the configuration called for by the configuration change input or indication.

9. A vehicle interior structure arrangement modification device for use in a vehicle, comprising:
   a processor configured to be communicatively coupled to an actuator configured to reconfigure a vehicle internal structure, wherein the processor is configured with processor-executable instructions to:
     determine whether to initiate a configuration change protocol to implement a configuration change for reconfiguring the vehicle internal structure in response to a planned or predicted future operating mode, event or environment;
     determine whether an occupancy status of the vehicle conflicts with an occupancy status allowed for in a configuration called for by a configuration change input or indication; and
     modify an arrangement of the vehicle internal structure in accordance with the configuration change input or indication in response to determining that the occupancy status of the vehicle does not conflict with the occupancy status allowed for in the configuration called for by the configuration change.

10. The vehicle interior structure arrangement modification device of claim 9, wherein the processor is further configured with processor-executable instructions to:
    determine whether a current vehicle configuration matches a configuration called for by the configuration change input or indication, wherein modifying the arrangement of the vehicle internal structure in accordance with the configuration change input or indication is further in response to determining that the current vehicle configuration does not match the configuration called for by the configuration change input or indication.

11. The vehicle interior structure arrangement modification device of claim 9, wherein the processor is further configured with processor-executable instructions such that modifying the arrangement of the vehicle internal structure in accordance with the configuration change input or indication comprises changing to a driverless configuration in response to determining that the occupancy status of the vehicle indicates that no occupant of the vehicle is or will drive the vehicle.

12. The vehicle interior structure arrangement modification device of claim 11, wherein the processor is further configured with processor-executable instructions such that changing to the driverless configuration comprises changing a facing direction of at least one seat in the vehicle.

13. The vehicle interior structure arrangement modification device of claim 11, wherein the processor is further configured with processor-executable instructions such that modify the arrangement of the vehicle internal structure in accordance with the configuration change input or indication comprises changing to a driven configuration in response to determining that an occupant is driving or will drive the vehicle.

14. The vehicle interior structure arrangement modification device of claim 13, wherein the processor is further configured with processor-executable instructions such that changing to the driven configuration comprises changing at least one of an orientation of a steering wheel or a direction a seat in the vehicle faces.

15. The vehicle interior structure arrangement modification device of claim 9, wherein the processor is further configured with processor-executable instructions to select one of a plurality of configuration alternatives based on the occupancy status in response to determining that the occupancy status of the vehicle does not conflict with the occupancy status allowed for in the configuration called for by the configuration change input or indication.

16. The vehicle interior structure arrangement modification device of claim 9, wherein the processor is further configured with processor-executable instructions to select one of a plurality of configuration alternatives based on a predicted occupancy status of the vehicle determined based on a configuration change input or indication in response to determining that the predicted occupancy status of the vehicle will not conflict with the occupancy status allowed for in the configuration called for by the configuration change input or indication.

17. A vehicle, comprising:
  actuators configured to change to reconfigure a vehicle internal structure; and
  a processor coupled to the actuators and configured with processor-executable instructions to:
    determine whether to initiate a configuration change protocol to implement a configuration change for reconfiguring the vehicle internal structure in response to a planned or predicted future operating mode, event or environment;
    determine whether an occupancy status of the vehicle conflicts with an occupancy status allowed for in a configuration called for by a configuration change input or indication; and
    control the actuators to modify an arrangement of the vehicle internal structure in accordance with the configuration change input or indication in response to determining that the occupancy status of the vehicle does not conflict with the occupancy status allowed for in the configuration called for by the configuration change.

18. The vehicle of claim 17, wherein the processor is further configured with processor-executable instructions to:
  determine whether a current vehicle configuration matches a configuration called for by the configuration change input or indication; and
  control the actuators to modify the arrangement of the vehicle internal structure in accordance with the configuration change input or indication further in response to determining that the current vehicle configuration does not match the configuration called for by the configuration change input or indication.

19. The vehicle of claim 17, wherein the processor is further configured with processor-executable instructions to control the actuators to modify the arrangement of the vehicle internal structure in accordance with the configuration change input or indication comprises changing to a driverless configuration in response to determining that the occupancy status of the vehicle indicates that no occupant of the vehicle is or will drive the vehicle.

20. The vehicle of claim 19, wherein the processor is further configured with processor-executable instructions such that changing to the driverless configuration comprises changing a facing direction of at least one seat in the vehicle.

21. The vehicle of claim 19, wherein the processor is further configured with processor-executable instructions to control the actuators to modify the arrangement of the vehicle internal structure in accordance with the configuration change input or indication by changing to a driven configuration in response to determining that an occupant is driving or will drive the vehicle.

22. The vehicle of claim 21, wherein the processor is further configured with processor-executable instructions such that changing to the driven configuration comprises changing at least one of an orientation of a steering wheel or a direction a seat in the vehicle faces.

23. The vehicle of claim 17, wherein the processor is further configured with processor-executable instructions to select one of a plurality of configuration alternatives based on the occupancy status in response to determining that the occupancy status of the vehicle does not conflict with the occupancy status allowed for in the configuration called for by the configuration change input or indication.

24. The vehicle of claim 17, wherein the processor is further configured with processor-executable instructions to select one of a plurality of configuration alternatives based on a predicted occupancy status of the vehicle in response to determining that the predicted occupancy status of the vehicle will not conflict with the occupancy status allowed for in the configuration called for by the configuration change input or indication.

25. A non-transitory processor-readable storage medium having stored thereon processor-executable instructions configured to cause a processor of a vehicle to perform operations comprising:
  determining whether to initiate a configuration change protocol to implement a configuration change for modifying an arrangement of a vehicle internal structure in response to a planned or predicted future operating mode, event or environment;
  determining whether an occupancy status of the vehicle conflicts with an occupancy status allowed for in a configuration called for by a configuration change input or indication; and
  modifying an arrangement of the vehicle internal structure in accordance with the configuration change input or indication in response to determining that the occupancy status of the vehicle does not conflict with the occupancy status allowed for in the configuration called for by the configuration change.

26. The non-transitory processor-readable storage medium of claim 25, wherein the stored processor-executable instructions are further configured to cause the processor of the vehicle to perform operations further comprising:
  determining whether a current vehicle configuration matches a configuration called for by the configuration change input or indication, wherein modifying the arrangement of the vehicle internal structure in accordance with the configuration change input or indication is further in response to determining that the current vehicle configuration does not match the configuration called for by the configuration change input or indication.

27. The non-transitory processor-readable storage medium of claim 25, wherein the stored processor-executable instructions are further configured to cause the processor of the vehicle to perform operations such that modifying the arrangement of the vehicle internal structure in accordance with the configuration change input or indication comprises changing to a driverless configuration in response to determining that the occupancy status of the vehicle indicates that no occupant of the vehicle is or will drive the vehicle.

28. The non-transitory processor-readable storage medium of claim 27, wherein the stored processor-executable instructions are further configured to cause the processor of the vehicle to perform operations such that changing to the driverless configuration comprises changing a facing direction of at least one seat in the vehicle.

29. The non-transitory processor-readable storage medium of claim 25, wherein the stored processor-executable instructions are further configured to cause the processor of the vehicle to perform operations such that modifying the arrangement of the vehicle internal structure in accordance with the configuration change input or indication comprises changing to a driven configuration in response to determining that an occupant is driving or will drive the vehicle.

30. The non-transitory processor-readable storage medium of claim 29, wherein the stored processor-executable instructions are further configured to cause the processor of the vehicle to perform operations such that changing to the driven configuration comprises changing at least one of an orientation of a steering wheel or a direction a seat in the vehicle faces.

31. The non-transitory processor-readable storage medium of claim 25, wherein the stored processor-executable instructions are further configured to cause the processor of the vehicle to perform operations further comprising:
    selecting a configuration alternative based on the occupancy status in response to determining that the occupancy status of the vehicle does not conflict with the occupancy status allowed for in the configuration called for by the configuration change input or indication.

32. The non-transitory processor-readable storage medium of claim 25, wherein the stored processor-executable instructions are further configured to cause the processor of the vehicle to perform operations further comprising:
    selecting one of a plurality of configuration alternatives based on a predicted occupancy status of the vehicle determined in response to determining that the predicted occupancy status of the vehicle will not conflict with the occupancy status allowed for in the configuration called for by the configuration change input or indication.

* * * * *